US012594851B2

(12) United States Patent
Cheng et al.

(10) Patent No.: US 12,594,851 B2
(45) Date of Patent: Apr. 7, 2026

(54) CHARGING CONTROL METHOD, APPARATUS, AND SYSTEM, SERVER, AND MEDIUM

(71) Applicant: SHENZHEN YINWANG INTELLIGENT TECHNOLOGIES CO., LTD., Shenzhen (CN)

(72) Inventors: Kang Cheng, Nanjing (CN); Jiajia Wang, Shenzhen (CN); Zemin Zhu, Nanjing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 496 days.

(21) Appl. No.: 18/158,975

(22) Filed: Jan. 24, 2023

(65) Prior Publication Data

US 2023/0158919 A1      May 25, 2023

Related U.S. Application Data

(63) Continuation of application No. PCT/CN2020/105866, filed on Jul. 30, 2020.

(51) Int. Cl.
*B60L 53/66*        (2019.01)
*B60L 53/68*        (2019.01)
(Continued)

(52) U.S. Cl.
CPC .............. *B60L 53/68* (2019.02); *B60L 53/66* (2019.02); *B60L 58/12* (2019.02); *H02J 7/933* (2026.01)

(58) Field of Classification Search
CPC .......... B60L 53/68; B60L 53/66; B60L 58/12; B60L 53/11; B60L 2240/70;
(Continued)

(56) References Cited

U.S. PATENT DOCUMENTS 8,963,494 B2    2/2015 Kishiyama et al.
9,126,494 B2    9/2015 Uyeki
(Continued)

FOREIGN PATENT DOCUMENTS

CN        102255113 A    11/2011
CN        102882262 A    1/2013
(Continued)

OTHER PUBLICATIONS

Extended European Search Report in European Appln No. 20946958.4, dated Jul. 28, 2023, 7 pages.
(Continued)

*Primary Examiner* — Santosh R Poudel
(74) *Attorney, Agent, or Firm* — Fish & Richardson P.C.

(57) ABSTRACT

Embodiments of this application provide a charging control method, apparatus, and system, a server, and a medium. In an example method, a generation sequence of a charging policy stored in a first terminal and a generation sequence of a charging policy stored in a second terminal are compared in the first terminal, to determine a relatively new charging policy in the first terminal and the second terminal as a target charging policy. The target charging policy may subsequently configure a charging parameter, so that the charging parameter configured in a charging process is adapted to a current performance status of a power battery of a vehicle.

18 Claims, 11 Drawing Sheets

(51) Int. Cl.
  *B60L 58/12* (2019.01)
  *H02J 7/90* (2026.01)

(58) Field of Classification Search
  CPC ...... B60L 2240/80; B60L 53/65; B60L 53/62;
  B60L 58/16; B60L 53/00; B60L 53/31;
  B60L 53/60; H02J 7/00712; Y02T 10/70;
  Y02T 10/7072; Y02T 90/12; Y02T 90/14;
  Y02T 90/167; Y04S 30/12
  See application file for complete search history.

(56) References Cited

U.S. PATENT DOCUMENTS

| | | | |
|---|---|---|---|
| 9,260,031 | B2 | 2/2016 | Ghosh et al. |
| 2012/0056583 | A1* | 3/2012 | Gotz ........................ B60L 53/14<br>320/109 |
| 2012/0262125 | A1 | 10/2012 | Fassnacht et al. |
| 2013/0002188 | A1 | 1/2013 | Uyeki |
| 2013/0035823 | A1* | 2/2013 | Yoshida ............... G07C 5/0841<br>701/302 |
| 2013/0346010 | A1* | 12/2013 | Schulz .................... B60L 53/14<br>324/602 |
| 2015/0032315 | A1* | 1/2015 | Kinomura ............. B60L 3/0069<br>701/22 |
| 2015/0217657 | A1* | 8/2015 | Kang ...................... B60L 53/65<br>307/9.1 |
| 2016/0009191 | A1* | 1/2016 | Becker ................... B60L 53/60<br>320/152 |
| 2016/0039301 | A1 | 2/2016 | Igarashi et al. |
| 2020/0111175 | A1 | 4/2020 | Uyeki et al. |
| 2021/0144548 | A1* | 5/2021 | Ben Henda ......... H04W 12/106 |
| 2021/0394642 | A1* | 12/2021 | Maeda .................... B60L 58/12 |

FOREIGN PATENT DOCUMENTS

| | | | |
|---|---|---|---|
| CN | 102904311 | A | 1/2013 |
| CN | 104995814 | A | 10/2015 |
| CN | 106299516 | A | 1/2017 |
| CN | 108656974 | A | 10/2018 |
| CN | 109861331 | A | 6/2019 |
| CN | 110103769 | A | 8/2019 |
| CN | 110723029 | A | 1/2020 |
| CN | 111086410 | A | 5/2020 |
| CN | 117445745 | A * | 1/2024 |
| EP | 3663124 | A1 | 6/2020 |
| WO | 2018099029 | A1 | 6/2018 |

OTHER PUBLICATIONS

Office Action in Chinese Appln. No. 202080004234.7, dated Sep. 15, 2021, 6 pages (with English translation).
Office Action in Chinese Appln. No. 202080004234.7, dated Jul. 12, 2021, 10 pages (with English translation).
International Search Report and Written Opinion in International Appln. No. PCT/CN2020/105866, mailed on May 8, 2021, 15 pages (with English translation).

* cited by examiner

CHARGING CONTROL METHOD, APPARATUS, AND SYSTEM, SERVER, AND MEDIUM

CROSS-REFERENCE TO RELATED APPLICATIONS

This application is a continuation of International Application No. PCT/CN2020/105866, filed on Jul. 30, 2020, the disclosure of which is hereby incorporated by reference in its entirety.

TECHNICAL FIELD

This application relates to the field of electric vehicle technologies, and in particular, to a charging control method, apparatus, and system, a server, and a medium.

BACKGROUND

With continuous progress of society and rapid development of economy, problems such as global energy shortage and environmental pollution become increasingly serious, and electric vehicle technologies also rapidly develop.

Currently, a fast charge technology of an electric vehicle is very popular. By using the fast charge technology, a power battery can be charged to a state of charge (SOC for short) of about 80% in a short time (for example, half an hour), to reduce mileage anxiety of a user. Therefore, the fast charge technology is welcomed by a large quantity of vehicle owners.

However, currently, when the electric vehicle is charged at different service providers, charging is generally performed based on a fixed charging policy. Because of an aging phenomenon of the power battery, when the battery in different statuses is charged by using the fixed policy, the charging may exceed the charging acceptance performance of the battery, accelerate shortening of a battery lifespan, and cause a potential safety hazard.

SUMMARY

This application provides a charging control method, apparatus, and system, a server, and a medium, so that a charging parameter configured in a charging process can be better adapted to a current performance status of a power battery of a vehicle, thereby improving a lifespan and charging safety of the power battery of the vehicle.

According to a first aspect, an embodiment of this application provides a charging control method, applied to a first terminal. The first terminal stores a first charging policy and first time attribute information generated based on a generation time point of the first charging policy. The method includes: receiving second time attribute information from a second terminal, where the second time attribute information is generated based on a generation time point of a second charging policy, and the second charging policy is stored in the second terminal; sending target charging policy information to the second terminal, where the target charging policy information is used to indicate a target charging policy that is determined by the first terminal based on the first time attribute information and the second time attribute information, and the target charging policy is a later generated charging policy in the first charging policy and the second charging policy; and configuring a charging parameter based on the target charging policy.

In the first aspect, a generation sequence of the charging policy stored in the first terminal and a generation sequence of the charging policy stored in the second terminal are compared in the first terminal, to determine the relatively new charging policy in the first terminal and the second terminal as the target charging policy. In this way, the target charging policy is used to subsequently configure the charging parameter, so that the charging parameter configured in a charging process can be better adapted to a current performance status of a power battery of a vehicle, to improve a lifespan and charging safety of the power battery of the vehicle.

Optionally, if the first terminal is a charging pile, a second charging pile is the vehicle or a charging apparatus in the vehicle; or if the second terminal is a charging pile, a first charging pile is the vehicle or a charging apparatus in the vehicle.

In a possible implementation, the generation time point of the first charging policy is later than or equal to the generation time point of the second charging policy. The target charging policy is the first charging policy. The target charging policy information includes the first charging policy.

In a possible implementation of the first aspect, when the generation time point of the first charging policy stored in the first terminal is later than the generation time point of the second charging policy stored in the second terminal, it indicates that the first charging policy stored in the first terminal is relatively new and can be better adapted to the current performance status of the power battery of the vehicle. Therefore, the charging parameter may be subsequently configured for the first terminal and the second terminal based on the first charging policy.

In a possible implementation, the generation time point of the first charging policy is earlier than or equal to the generation time point of the second charging policy. The target charging policy is the second charging policy. The method further includes: receiving the second charging policy from the second terminal.

In a possible implementation of the first aspect, when the generation time point of the first charging policy stored in the first terminal is earlier than the generation time point of the second charging policy stored in the second terminal, it indicates that the second charging policy stored in the second terminal is relatively new and can be better adapted to the current performance status of the power battery of the vehicle. In this case, the first terminal may receive the second charging policy from the second terminal, so that the charging policies in the first terminal and the second terminal are consistent to complete policy matching. Therefore, the charging parameter may be subsequently configured for the first terminal and the second terminal based on the second charging policy.

In a possible implementation, before the receiving second time attribute information from a second terminal, the method further includes: performing a charging handshake with the second terminal.

In a possible implementation of the first aspect, after the charging handshake is completed between the first terminal and the second terminal, a generation sequence of charging policy information stored in the first terminal and a generation sequence of charging policy information stored in the second terminal are compared, to determine relatively new charging policy information as the target charging policy information. In this way, the target charging policy information corresponding to a target charging policy identifier is used to subsequently configure the charging parameter, so that the charging parameter configured in the charging process can be better adapted to the current performance status of the power battery of the vehicle, to improve the lifespan and the charging safety of the power battery of the vehicle.

In a possible implementation, the target charging policy includes a plurality of state of charge ranges and a plurality of phase charging policies. The plurality of state of charge ranges are in one-to-one correspondence with the plurality of phase charging policies. The configuring a charging parameter based on the target charging policy includes: selecting one phase charging policy from the plurality of phase charging policies as a current phase charging policy based on a current state of charge and the target charging policy; and configuring the charging parameter based on the current phase charging policy.

In a possible implementation, the configuring a charging parameter based on the target charging policy further includes: reselecting one phase charging policy from the plurality of phase charging policies based on a change of the current state of charge to update the current phase charging policy; and reconfiguring the charging parameter based on the updated current phase charging policy.

In a possible implementation of the first aspect, the current charging parameter is determined and updated from the plurality of phase charging policies based on the current state of charge, to implement multi-phase charging. Therefore, a proper charging parameter is matched at each SOC level or each SOC interval, so that the charging parameter configured in the charging process can be better adapted to the current performance status of the power battery of the vehicle.

In a possible implementation, the method further includes: receiving the first charging policy and the first time attribute information from a server.

In a possible implementation, the method further includes: sending a charging service request to the server, where the charging service request includes an identity of the vehicle.

According to a second aspect, an embodiment of this application provides a charging control method, applied to a second terminal. The second terminal stores a second charging policy and second time attribute information generated based on a generation time point of the second charging policy. The method includes: sending the second time attribute information to a first terminal; receiving target charging policy information from the first terminal, where the target charging policy information is used to indicate a target charging policy that is determined by the first terminal based on first time attribute information and the second time attribute information, the first time attribute information is generated based on a generation time point of a first charging policy stored in the first terminal, and the target charging policy is a later generated charging policy in the first charging policy and the second charging policy; and configuring a charging parameter based on the target charging policy.

In a possible implementation, the generation time point of the first charging policy is later than or equal to the generation time point of the second charging policy. The target charging policy is the first charging policy. The target charging policy information includes the first charging policy.

In a possible implementation, the generation time point of the first charging policy is earlier than or equal to the generation time point of the second charging policy. The target charging policy is the second charging policy. The method further includes: sending the second charging policy to the first terminal.

In a possible implementation, before the sending the second time attribute information to a first terminal, the method further includes: performing a charging handshake with the first terminal.

In a possible implementation, the target charging policy includes a plurality of state of charge ranges and a plurality of phase charging policies. The plurality of state of charge ranges are in one-to-one correspondence with the plurality of phase charging policies. The configuring a charging parameter based on the target charging policy includes: selecting one phase charging policy from the plurality of phase charging policies as a current phase charging policy based on a current state of charge and the target charging policy; and configuring the charging parameter based on the current phase charging policy.

In a possible implementation, the configuring a charging parameter based on the target charging policy further includes: reselecting one phase charging policy from the plurality of phase charging policies based on a change of the current state of charge to update the current phase charging policy; and reconfiguring the charging parameter based on the updated current phase charging policy.

In a possible implementation, the method further includes: receiving the second charging policy and the second time attribute information from a server.

According to a third aspect, an embodiment of this application further provides a charging control method, including: receiving a charging service request sent by a vehicle, where the charging service request includes an identity of the vehicle; generating a charging policy based on the identity and historical charging and discharging data of a battery in the vehicle; generating time attribute information based on a time point at which the charging policy is generated; and sending the charging policy and the time attribute information to the vehicle.

According to a fourth aspect, an embodiment of this application further provides a charging control apparatus, including: a storage module, configured to store a first charging policy and first time attribute information generated based on a generation time point of the first charging policy; a receiving module, configured to receive second time attribute information from a second terminal, where the second time attribute information is generated based on a generation time point of a second charging policy, and the second charging policy is stored in the second terminal; a sending module, configured to send target charging policy information to the second terminal, where the target charging policy information is used to indicate a target charging policy that is determined based on the first time attribute information and the second time attribute information, and the target charging policy is a later generated charging policy in the first charging policy and the second charging policy; and a configuration module, configured to configure a charging parameter based on the target charging policy.

In a possible design, the generation time point of the first charging policy is later than or equal to the generation time point of the second charging policy. The target charging policy is the first charging policy. The target charging policy information includes the first charging policy.

In a possible design, the generation time point of the first charging policy is earlier than or equal to the generation time point of the second charging policy. The target charging policy is the second charging policy. The receiving module is further configured to receive the second charging policy from the second terminal.

In a possible design, the sending module and the receiving module are further configured to perform a charging handshake with the second terminal.

In a possible design, the target charging policy includes a plurality of state of charge ranges and a plurality of phase charging policies. The plurality of state of charge ranges are in one-to-one correspondence with the plurality of phase charging policies. The configuration module is specifically configured to: select one phase charging policy from the plurality of phase charging policies as a current phase charging policy based on a current state of charge and the target charging policy; and configure the charging parameter based on the current phase charging policy.

In a possible design, the configuration module is further configured to: reselect one phase charging policy from the plurality of phase charging policies based on a change of the current state of charge to update the current phase charging policy; and reconfigure the charging parameter based on the updated current phase charging policy.

In a possible design, the receiving module is further configured to receive the first charging policy and the first time attribute information from a server.

According to a fifth aspect, an embodiment of this application further provides a charging control apparatus, including: a storage module, configured to store a second charging policy and second time attribute information generated based on a generation time point of the second charging policy; a sending module, configured to send the second time attribute information to a first terminal; a receiving module, configured to receive target charging policy information from the first terminal, where the target charging policy information is used to indicate a target charging policy that is determined by the first terminal based on the first time attribute information and the second time attribute information, the first time attribute information is generated based on a generation time point of a first charging policy stored in the first terminal, and the target charging policy is a later generated charging policy in the first charging policy and the second charging policy; and a configuration module, configured to configure a charging parameter based on the target charging policy.

In a possible design, the generation time point of the first charging policy is later than or equal to the generation time point of the second charging policy. The target charging policy is the first charging policy. The target charging policy information includes the first charging policy.

In a possible design, the generation time point of the first charging policy is earlier than or equal to the generation time point of the second charging policy. The target charging policy is the second charging policy. The sending module is further configured to send the second charging policy to the first terminal.

In a possible design, the sending module and the receiving module are further configured to perform a charging handshake with the first terminal.

In a possible design, the target charging policy includes a plurality of state of charge ranges and a plurality of phase charging policies. The plurality of state of charge ranges are in one-to-one correspondence with the plurality of phase charging policies. The configuration module is specifically configured to: select one phase charging policy from the plurality of phase charging policies as a current phase charging policy based on a current state of charge and the target charging policy; and configure the charging parameter based on the current phase charging policy.

In a possible design, the configuration module is further configured to: reselect one phase charging policy from the plurality of phase charging policies based on a change of the current state of charge to update the current phase charging policy; and reconfigure the charging parameter based on the updated current phase charging policy.

In a possible design, the receiving module is further configured to receive the first charging policy and the first time attribute information from a server.

If the charging control apparatus in the fourth aspect is a charging pile, the charging control apparatus in the fifth aspect is a vehicle or a charging apparatus in a vehicle; or
    if the charging control apparatus in the fourth aspect is a vehicle or a charging apparatus in a vehicle, the charging control apparatus in the fifth aspect is a charging pile.

According to a sixth aspect, an embodiment of this application further provides a server, including: a receiving module, configured to receive a charging service request sent by a vehicle, where the charging service request includes an identity of the vehicle; a processing module, configured to generate a charging policy based on the identity and historical charging and discharging data of a battery in the vehicle, where the processing module is further configured to generate time attribute information based on a time point at which the charging policy is generated; and a sending module, configured to send the charging policy and the time attribute information to the vehicle.

In a possible design, the receiving module is further configured to receive the historical charging and discharging data sent by the vehicle. In addition, the receiving module is further configured to receive historical charging data sent by the charging pile.

According to a seventh aspect, an embodiment of this application further provides a charging control apparatus, including: a processor; and a memory, configured to store a computer program in the processor. The processor is configured to implement, through executing the computer program, any charging control method according to the first aspect.

According to an eighth aspect, an embodiment of this application further provides a charging control apparatus, including: a processor; and a memory, configured to store a computer program in the processor. The processor is configured to implement, through executing the computer program, any charging control method according to the second aspect.

If the charging control apparatus in the eighth aspect is a charging pile, the charging control apparatus in the seventh aspect is a vehicle or a charging apparatus in a vehicle; or
    if the charging control apparatus in the eighth aspect is a vehicle or a charging apparatus in a vehicle, the charging control apparatus in the seventh aspect is a charging pile.

According to a ninth aspect, an embodiment of this application further provides a server, including: a processor; and a memory, configured to store a computer program in the processor. The processor is configured to implement, through executing the computer program, any charging control method according to the third aspect.

According to a tenth aspect, an embodiment of this application further provides a charging control system, including: the charging control apparatus according to the fourth aspect and the charging control apparatus according to the fifth aspect.

In a possible implementation, the foregoing charging control system further includes the server according to the sixth aspect.

According to an eleventh aspect, an embodiment of this application further provides a charging control system, including: the charging control apparatus according to the seventh aspect and the charging control apparatus according to the eighth aspect.

In a possible implementation, the foregoing charging control system further includes the server according to the ninth aspect.

According to a twelfth aspect, an embodiment of this application further provides a computer-readable storage medium. A computer program is stored in the computer-readable storage medium. The computer program is executed by a processor to perform the charging control method according to the first aspect.

According to a thirteenth aspect, an embodiment of this application further provides a computer-readable storage medium. A computer program is stored in the computer-readable storage medium. The computer program is executed by a processor to perform the charging control method according to the second aspect.

According to a fourteenth aspect, an embodiment of this application further provides a computer-readable storage medium. A computer program is stored in the computer-readable storage medium. The computer program is executed by a processor to perform the charging control method according to the third aspect.

According to a fifteenth aspect, an embodiment of this application further provides a computer program product. When the computer program product runs on an electronic device, the electronic device is enabled to perform the charging control method according to the first aspect.

According to a sixteenth aspect, an embodiment of this application further provides a computer program product. When the computer program product runs on an electronic device, the electronic device is enabled to perform the charging control method according to the second aspect.

According to a seventeenth aspect, an embodiment of this application further provides a computer program product. When the computer program product runs on an electronic device, the electronic device is enabled to perform the charging control method according to the third aspect.

Embodiments of this application provide the charging control method, apparatus, and system, the server, and the medium. The generation sequence of the charging policy stored in the first terminal and the generation sequence of the charging policy stored in the second terminal are compared in the first terminal, to determine the relatively new charging policy in the first terminal and the second terminal as the target charging policy. In this way, the target charging policy is used to subsequently configure the charging parameter, so that the charging parameter configured in the charging process can be better adapted to the current performance status of the power battery of the vehicle, to improve lifespan and the charging safety of the power battery of the vehicle.

DESCRIPTION OF EMBODIMENTS

Mileage anxiety indicates a concern that a vehicle owner or a vehicle driver considers that a vehicle does not have enough endurance mileage to reach a destination of the vehicle, and therefore breaks down on a road. The mileage anxiety mainly occurs for a battery electric vehicle. This is also considered a major obstacle for popularizing the electric vehicle in a large scale. Especially, when there is no breakthrough progress in a battery technology at a current phase and a charging pile is not fully popularized, the mileage anxiety problem greatly affects user experience, and also affects sales of the electric vehicle and another electricity-driven tool.

Currently, a fast charge technology of the electric vehicle is very popular. By using the fast charge technology, a power battery can be charged to a SOC level of about 80% in a short time (for example, half an hour), to reduce mileage anxiety of a user. Therefore, the fast charge technology is welcomed by a large quantity of vehicle owners. It should be noted that, a SOC is a ratio of a remaining capacity to a capacity in a fully charged state after a battery is used for a period of time or is not used for a long time, and is generally represented by using a percentage. A value range of the SOC is 0-1.

Figure 1:
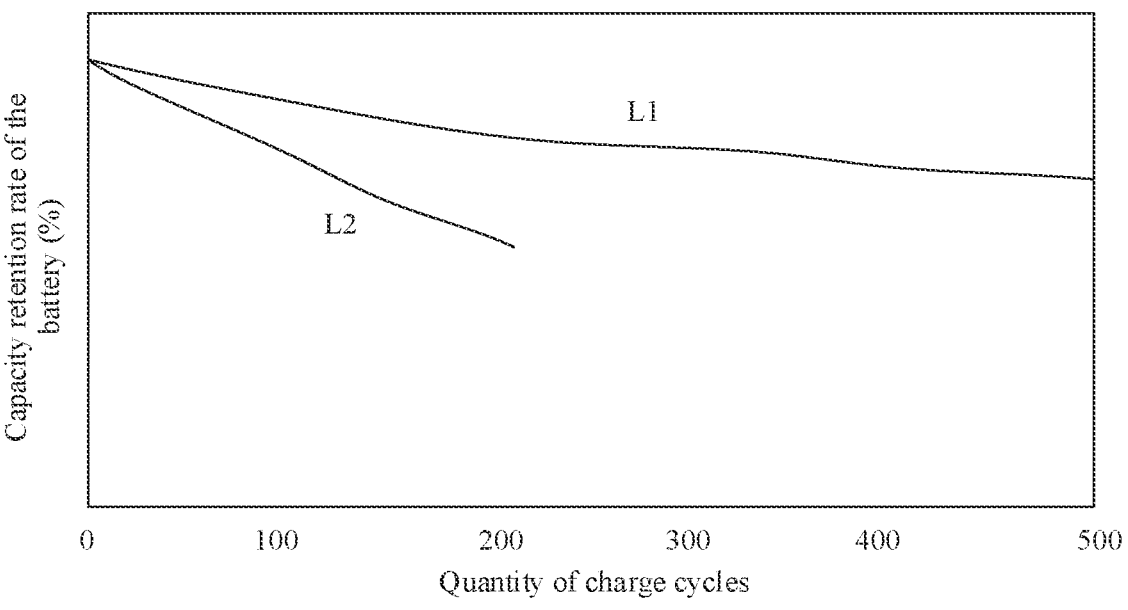
FIG. 1 is a diagram of comparison between performance attenuation of a slowly charged battery and that of a fast charged battery at a normal temperature.

However, FIG. 1 is a diagram of comparison between performance attenuation of a slowly charged battery and that of a fast charged battery at a normal temperature. As shown in FIG. 1, L1 is a battery capacity attenuation curve when a power battery is continuously and slowly charged, and L2 is a battery capacity attenuation curve when a power battery is continuously and fast charged. In comparison, continuous fast charge can accelerate battery capacity attenuation.

The essence of the fast charge is that a direct current is directly stored in a battery. The direct current has a very high power. A voltage during charging is about 400 V-500 V, and a current is about 20 A-30 A. In a charging process, a large quantity of electrons continuously accelerate and flow from a positive electrode to a negative electrode of the battery. In this process, high heat is generated. However, because a temperature rises, a semi-permeable film on a surface of the negative electrode of the battery (similar to a separation wall that separates an electrode material from an electrolyte to avoid reaction) is broken. In this case, the reaction occurs. Therefore, a foreign matter is generated on the electrode, and the electrolyte is decomposed. As time passes, the battery capacity slowly decreases, resulting in shortened life endurance mileage and reduced user experience.

In addition, when the battery is aged, use of high-power fast charge easily causes an accident. According to statistics, an accident rate directly or indirectly caused due to the use of fast charge is as high as 29% in accidents of new energy vehicles in 2018. This is mainly because stability of the battery becomes worse after being fast charged for 300 times to 500 times. A thermal runaway temperature of a common ternary lithium battery is about 215 degrees. However, a thermal runaway critical value of the ternary lithium battery that is frequently fast charged falls to 107 degrees. This more easily triggers a fire breakout event caused due to thermal runaway of the battery. Therefore, the battery in different health statuses has different charging manners. For example, if the battery is aged, a maximum charging current needs to be less than a charging current of a new battery.

Generally, a fast charge service provider may obtain an optimal charging policy of the battery through calculation based on historical charging data of the battery. However, generally, the user is not bound to one charging service provider. If the user charges at different service providers for a long time, an optimal charging policy provided by a service provider is not an optimal policy obtained based on a recent battery status. Therefore, how to ensure that the optimal charging policy used by the user for each time of charging is generated based on the recent battery status is a problem that needs to be resolved.

Figure 2:
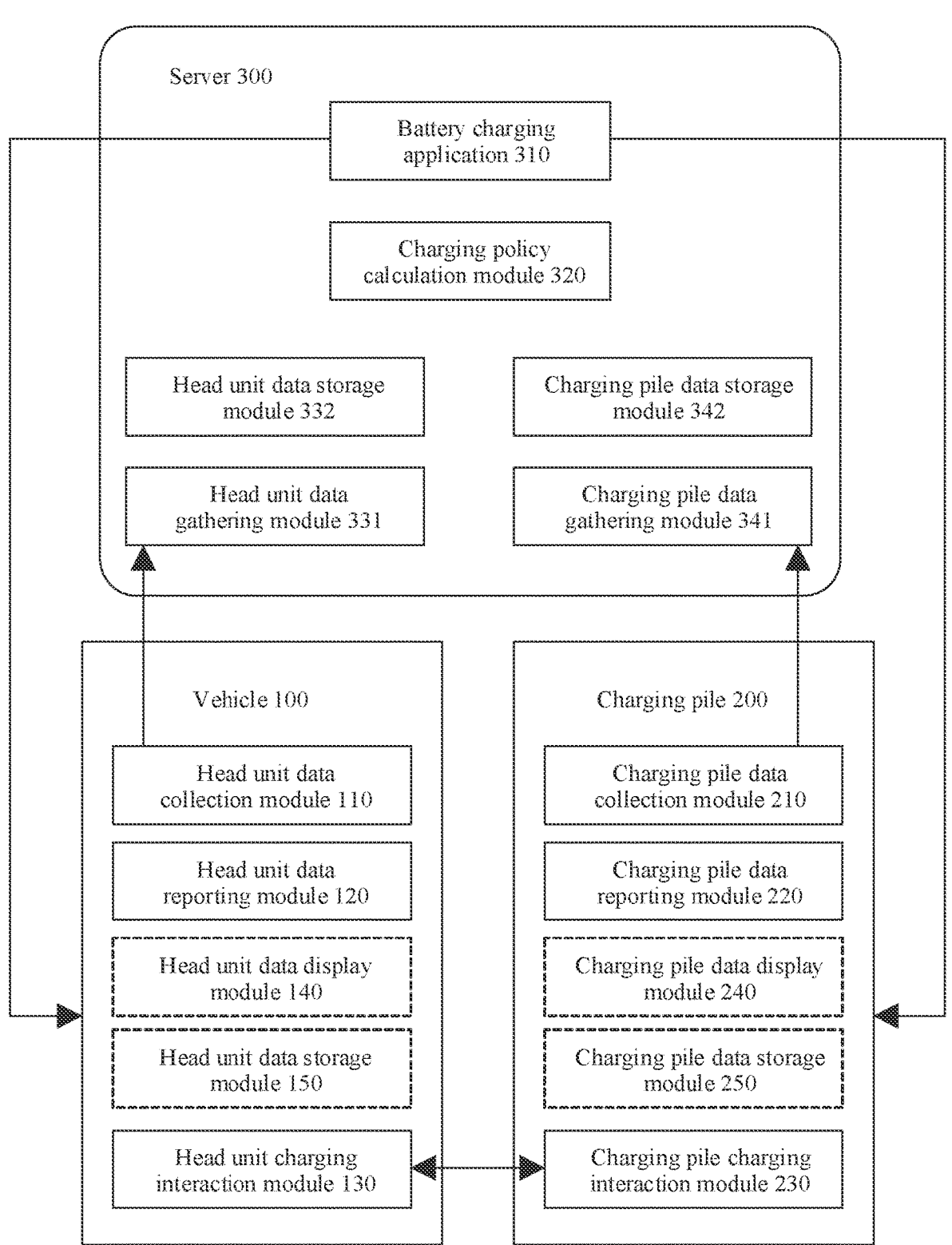
FIG. 2 is a schematic diagram of an architecture of a charging control system according to an embodiment of this application.

FIG. 2 is a schematic diagram of an architecture of a charging control system according to an embodiment of this application. As shown in FIG. 2, the charging control system provided in this embodiment includes a battery management system vehicle 100, a charging pile 200, and a server 300. The server 300 may be in communication connection to only the vehicle 100, or may be in communication connection to only the charging pile 200, or may be separately in communication connection to the vehicle 100 and the charging pile 200.

Specifically, the vehicle 100 includes a head unit data collecting module 110, a head unit data reporting module 120, and a head unit charging interaction module 130. The head unit data collecting module 110 is configured to collect charging and discharging data of an in-vehicle power battery in the vehicle 100. Then the collected data is sent to a head unit data gathering module 331 in the server 300 by using the head unit data reporting module 120. The collected data is stored in a head unit data storage module 332 in the server 300.

The charging pile 200 includes a charging pile data collecting module 210, a charging pile data reporting module 220, and a charging pile charging interaction module 230. The charging pile data collecting module 210 is configured to collect charging data of the charging pile 200. Then the collected data is sent to a charging pile data gathering module 341 in the server 300 by using the charging pile data reporting module 220. The collected data is stored in a charging pile data storage module 342 in the server 300.

The server 300 further includes a battery charging application 310 and a charging policy calculation module 320. The battery charging application 310 provides a charging application, and is configured to deliver a charging policy. The charging policy calculation module 320 is configured to determine the charging policy based on the historical charging and discharging data in the head unit data storage module 332 and the charging pile data storage module 342 at a bottom layer. The charging policy calculation module 320 serves as a middle layer to provide services related to data analysis and a basic algorithm for the battery charging application 310 at an upper layer. An algorithm for determining the charging policy based on the historical charging and discharging data may be various policy determining algorithms in the conventional technologies. This is not specifically limited in this embodiment.

In addition, after the battery charging application 310 delivers the charging policy to the vehicle 100 and/or the charging pile 200, the head unit charging interaction module 130 in the vehicle 100 and the charging pile charging interaction module 230 in the charging pile 200 perform related charging procedure configuration. The charging procedure configuration includes charging policy matching and charging parameter configuration.

Still with reference to FIG. 2, the vehicle 100 may further include a head unit data display module 140 and a head unit data storage module 150, and the charging pile 200 may further include a charging pile data display module 240 and a charging pile data storage module 250. When the vehicle 100 is being charged, the head unit data display module 140 may display related charging information (for example, a current remaining quantity of electricity, remaining charging duration, and a battery temperature) on the vehicle. The head unit data storage module 150 may be configured to store a charging policy identifier and charging policy information. Similarly, when the charging pile 200 charges the vehicle 100, the charging pile data display module 240 may display related charging information (for example, a current output quantity of electricity, remaining charging duration, and a battery temperature) on the charging pile 200. The charging pile data storage module 250 may be configured to store a charging policy identifier and charging policy information.

Figure 3:
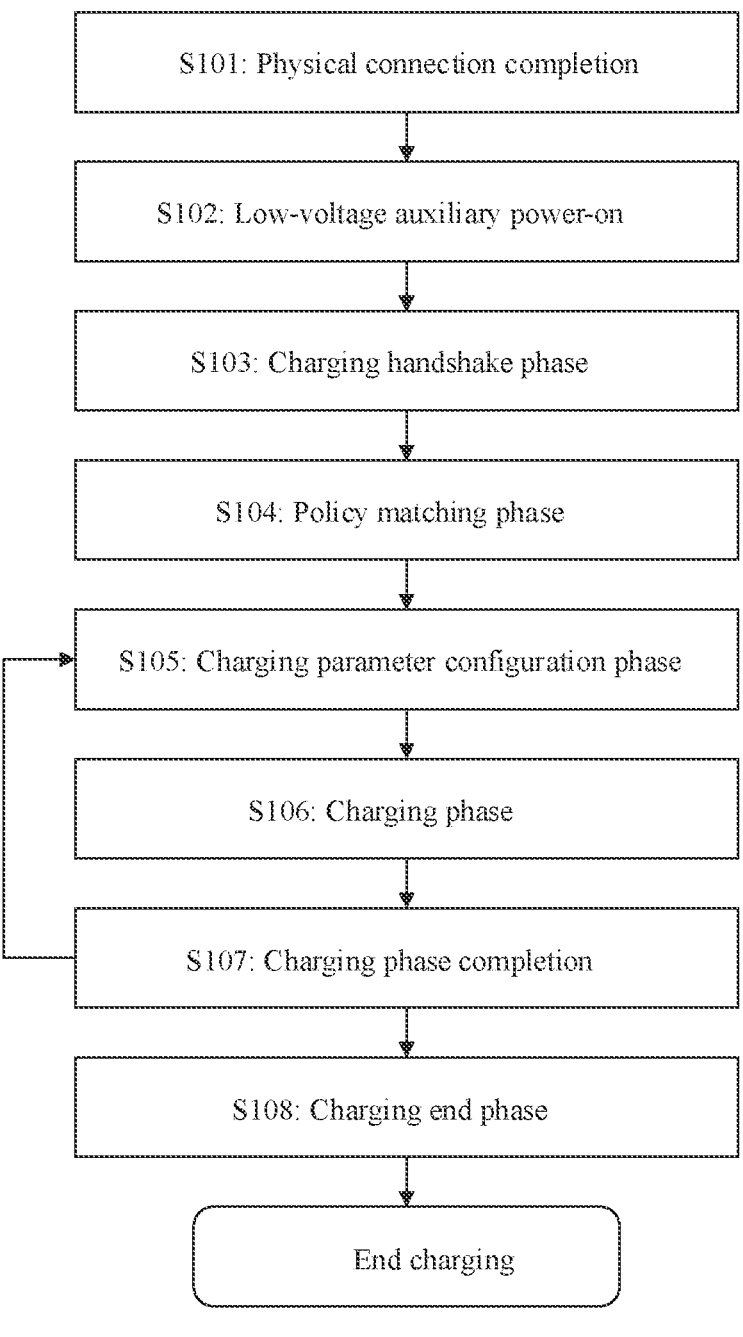
FIG. 3 is a schematic diagram of a whole charging procedure according to an embodiment of this application.

Based on the architecture of the charging control system shown in FIG. 2, FIG. 3 is a schematic diagram of a whole charging procedure according to an embodiment of this application. As shown in FIG. 3, the whole charging procedure provided in this embodiment includes eight phases. S101: Physical connection completion. S102: Low-voltage auxiliary power-on. S103: Charging handshake phase. S104: Policy matching phase. S105: Charging parameter configuration phase. S106: Charging phase. S107: Charging phase completion. S108: Charging end phase.

Specifically, the charging handshake phase is divided into a handshake start phase and a handshake identification phase. After the charging pile and a BMS are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of the battery and the charging pile.

After the charging handshake phase is completed, the charging pile and the BMS need to enter a policy matching phase to determine target charging policy information. The target charging policy information is charging policy information with a later generation time point in the charging pile and the BMS. Therefore, when the vehicle is being charged, a used charging policy is a charging policy determined based on relatively new battery charging and discharging data, so that the currently used charging policy better matches a battery status of the power battery of the current vehicle, thereby improving a lifespan and charging safety of the power battery of the vehicle. Optionally, the charging policy information in the charging pile may come from a server bound to the charging pile, and the charging policy information in the BMS may come from the server bound to the vehicle. In addition, the charging policy information sent by the server may be an optimal charging policy determined based on the historical charging and discharging data.

After completing the policy matching phase and determining the target charging policy information, the charging pile and the BMS may configure a charging parameter based on the determined target charging policy information. Optionally, the target charging policy information may be that different charging parameters are configured at different SOC levels. The target charging policy information may be in a first-type form or a second-type form. The first-type form may include a largest charging voltage, a largest charging current, and a highest temperature at different SOC levels. The second-type form may include a largest charging voltage, a largest charging current, and a highest temperature at different SOC level intervals.

For the first-type form, refer to the following Table 1.

TABLE 1

| SOC level | 1 | 2 | 3 | 4 | ... | 99 | 100 |
|---|---|---|---|---|---|---|---|
| Largest charging voltage | V1 | V2 | V3 | V4 | ... | V99 | V100 |
| Largest charging current | I1 | I2 | I3 | I4 | ... | I99 | I100 |
| Highest charging temperature | T1 | T2 | T3 | T4 | ... | T99 | T100 |

With reference to Table 1, after the charging pile and the BMS complete the policy matching phase and determine the target charging policy information, a current SOC level and a target charging parameter may be obtained to determine a current charging parameter. For example, if the current SOC level is 1, the current charging parameter may be determined as a largest charging voltage (V1), a largest charging current (I1), and a highest charging temperature (T1). Therefore, the charging pile and the BMS configure the charging parameter based on the largest charging voltage (V1), the largest charging current (I1), and the highest charging temperature (T1). When it is determined that a charging phase from a SOC level 1 to a SOC level 2 is completed, that is, the current SOC level reaches 2, the current charging parameter is updated to a largest charging voltage (V2), a largest charging current (I2), and a highest charging temperature (T2) until the charging ends.

In addition, for the second-type form, refer to the following Table 2.

TABLE 2

| SOC interval | Interval 1 | Interval 2 | Interval 3 | ... | Interval 4 |
|---|---|---|---|---|---|
| Largest charging voltage | V1 | V2 | V3 | ... | V4 |
| Largest charging current | I1 | I2 | I3 | ... | I4 |
| Highest charging temperature | T1 | T2 | T3 | ... | T4 |

With reference to Table 2, after the charging pile and the BMS complete the policy matching phase and determine the target charging policy information, the current SOC level and the target charging parameter may be obtained to determine the current charging parameter. For example, if the current SOC level is in an interval 1, the current charging parameter may be determined as the largest charging voltage (V1), the largest charging current (I1), and the highest charging temperature (T1). Therefore, the charging pile and the BMS configure the charging parameter based on the largest charging voltage (V1), the largest charging current (I1), and the highest charging temperature (T1). When it is determined that a charging phase in a SOC level interval 1 is completed, that is, the current SOC level reaches an interval 2, the current charging parameter is updated to the largest charging voltage (V2), the largest charging current (I2), and the highest charging temperature (T2) until the charging ends.

In the whole charging phase, the BMS sends a battery charging requirement to the charging pile in real time. The charging pile adjusts a charging voltage and a charging current based on the battery charging requirement to ensure that the charging process is normally implemented. In the charging process, the charging pile and the BMS send respective charging statuses to each other. In addition, the BMS sends specific status information of the power battery and information such as a voltage and a temperature to the charging pile based on the requirement.

The BMS determines whether to end the charging, based on whether the charging process is normal, whether the battery status meets a charging end condition set by the BMS, and whether a charging pile charging interruption packet (including a specific interruption reason, a packet parameter value that is all 0, and an untrusted status) is received. The charging pile determines whether to end the charging, based on whether a charging stop indication is received, whether the charging process is normal, whether a manually specified charging parameter value is reached, or whether a BMS charging interruption packet (including a specific interruption reason, a packet parameter value that is all 0, and an untrusted status) is received.

When the charging pile and the BMS stop the charging, the two parties enter the charging end phase. In this phase, the BMS sends charging statistics data in the whole charging process to the charging pile, including an initial SOC, an end SOC, and a lowest voltage and a highest voltage of the battery. After receiving the charging statistics data of the BMS, the charging pile sends information such as an output quantity of electricity and accumulated charging duration in the whole charging process to the BMS, and finally stops output of the low-voltage auxiliary power supply.

Figure 4:
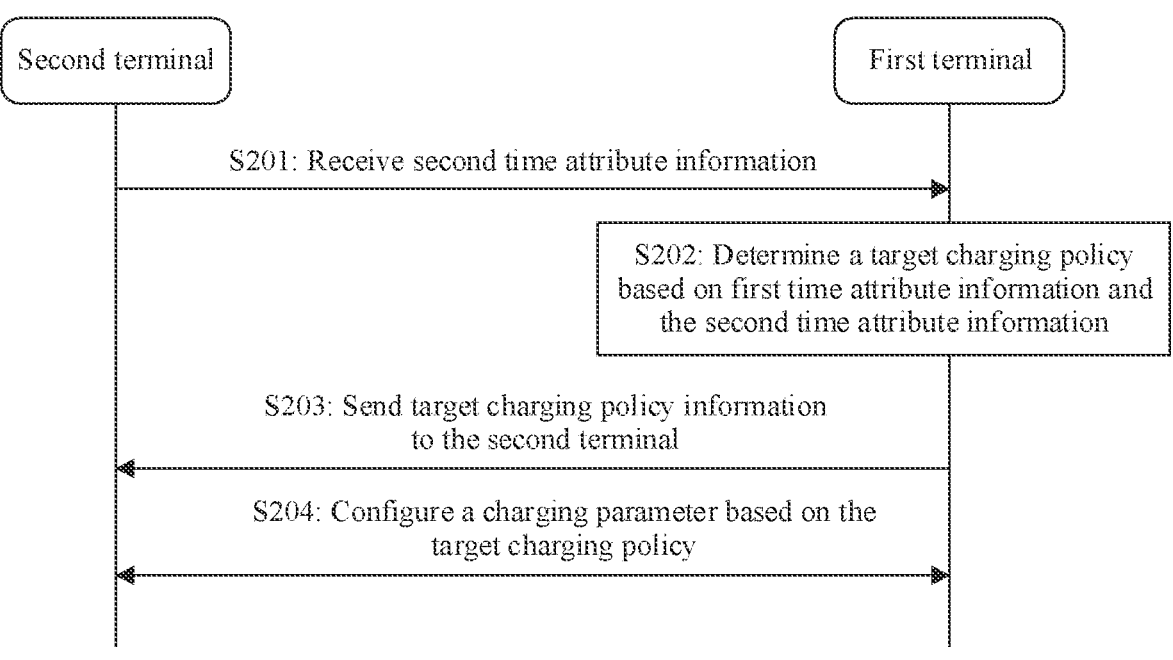
FIG. 4 is a schematic flowchart of a first charging control method according to an embodiment of this application.

FIG. 4 is a schematic flowchart of a first charging control method according to an embodiment of this application. As shown in FIG. 4, this embodiment provides the charging control method. The method may be performed by a first terminal. In addition, the first terminal stores a first charging policy and first time attribute information generated based on a generation time point of the first charging policy. In other words, the first time attribute information is used to indicate the generation time point of the first charging policy. The method may include the following steps.

S201: Receive second time attribute information.

In this step, the first terminal may receive the second time attribute information from a second terminal. The second charging policy is stored in the second terminal. The second time attribute information is generated based on a generation time point of the second charging policy. In other words, the second time attribute information is used to indicate the generation time point of the second charging policy.

S202: Determine a target charging policy based on the first time attribute information and the second time attribute information.

After obtaining the second time attribute information in the second terminal, the first terminal determines the target charging policy based on the first time attribute information and the second time attribute information. The target charging policy is a later generated charging policy in the first charging policy and the second charging policy. In other words, the later generated charging policy is determined through comparing a time point indicated by using the first time attribute information and a time point indicated by using the second time attribute information. It can be learned that the target charging policy is a relatively new charging policy in the first terminal and the second terminal, and can be better adapted to a current performance status of a power battery.

S203: Send target charging policy information to the second terminal.

After determining the target charging policy, the first terminal may send, to the second terminal, the target charging policy information corresponding to the target charging policy.

S204: Configure a charging parameter based on the target charging policy.

After the target charging policy is determined, the first terminal and the second terminal may separately subsequently configure the charging parameter based on the determined target charging policy.

In this embodiment, a generation sequence of the charging policy stored in the first terminal and a generation sequence of the charging policy stored in the second terminal are compared in the first terminal, to determine a relatively new charging policy in the first terminal and the second terminal as the target charging policy. In this way, the target charging policy is used to subsequently configure the charging parameter, so that the charging parameter configured in a charging process can be better adapted to a current performance status of the power battery of the vehicle, to improve a lifespan and charging safety of the power battery of the vehicle.

It should be noted that when the first terminal may be a vehicle or a charging apparatus in a vehicle, the second terminal may be a charging pile; or when the first terminal may be a charging pile, the second terminal may be a vehicle or a charging apparatus in a vehicle.

Figure 5:
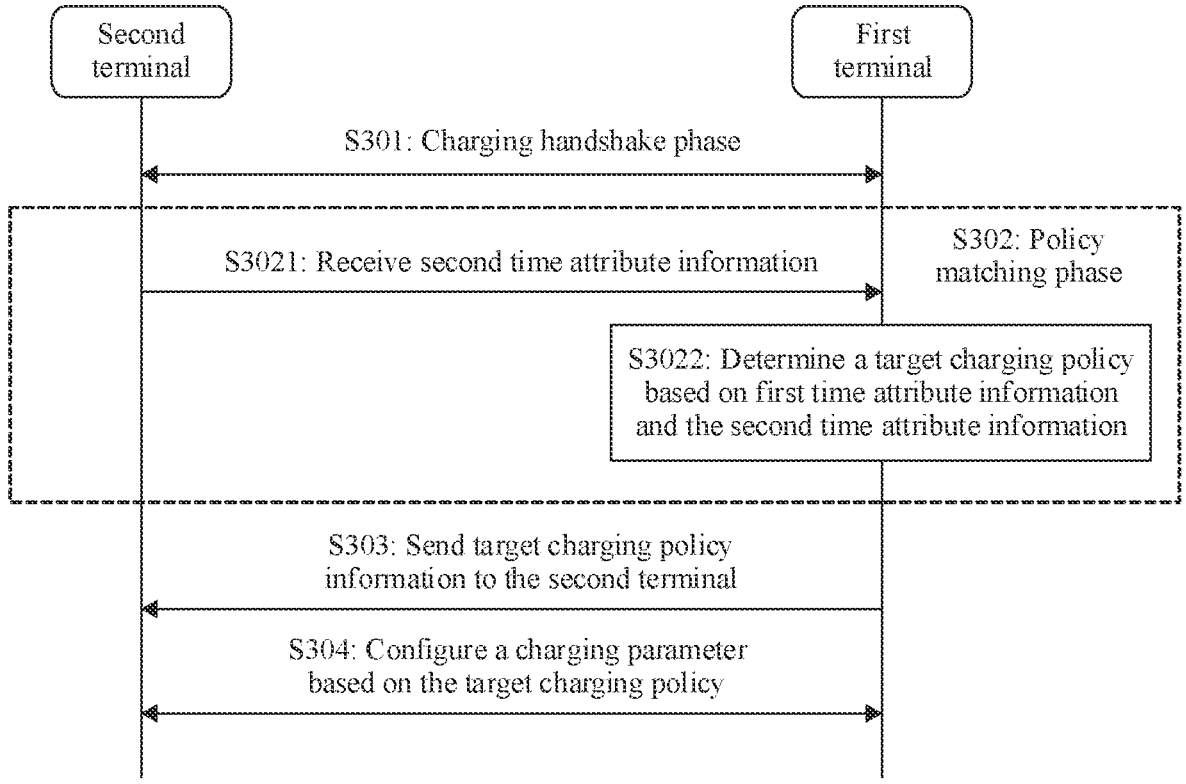
FIG. 5 is a schematic flowchart of a second charging control method according to an embodiment of this application.

FIG. 5 is a schematic flowchart of a second charging control method according to an embodiment of this application. As shown in FIG. 5, the charging control method provided in this embodiment includes the following steps.

S301: Charging handshake phase.

Specifically, the charging handshake phase is divided into a handshake start phase and a handshake identification phase. After a charging pile and a BMS are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of a battery and the charging pile. After the charging handshake phase is completed, the charging pile and the BMS enter a charging parameter configuration phase. In this phase, the charging pile sends a packet of a largest output capability of the charging pile to the BMS. The BMS determines, based on the largest output capability of the charging pile, whether the charging can be performed.

S302: Policy matching phase.

After the charging pile and the BMS complete the charging handshake phase, to determine the target charging policy, policy matching needs to be further performed before the charging phase is performed. Step S302 may include the following steps.

S3021: Receive second time attribute information.

Specifically, a first terminal may receive the second time attribute information from a second terminal. A second charging policy is stored in the second terminal. The second time attribute information is generated based on a generation time point of the second charging policy. In other words, the second time attribute information is used to indicate the generation time point of the second charging policy.

S3022: Determine a target charging policy based on first time attribute information and the second time attribute information.

After obtaining the second time attribute information in the second terminal, the first terminal determines the target charging policy based on the first time attribute information and the second time attribute information. The target charging policy is a later generated charging policy in a first charging policy and the second charging policy. In other words, the later generated charging policy is determined through comparing a time point indicated by using the first time attribute information and a time point indicated by using the second time attribute information. It can be learned that the target charging policy is a relatively new charging policy in the first terminal and the second terminal, and can be better adapted to a current performance status of a power battery.

In addition, in a possible case, the first charging policy and the first time attribute information in the first terminal may be received and obtained from a server. The server may actively deliver the first charging policy and the first time attribute information to the first terminal. Alternatively, the first terminal may send a request to the server, and then the server delivers the first charging policy and the first time attribute information to the first terminal in response to the request.

The second charging policy and the second time attribute information in the second terminal may also be received and obtained from the server. The server may actively deliver the second charging policy and the second time attribute information to the second terminal. Alternatively, the second terminal may send a request to the server, and then the server delivers the second charging policy and the second time attribute information to the second terminal in response to the request.

If the generation time point of the first charging policy is later than or equal to the generation time point of the second charging policy, the target charging policy is the first charging policy. The target charging policy information includes the first charging policy. Alternatively, if the generation time point of the first charging policy is earlier than or equal to the generation time point of the second charging policy, the target charging policy is the second charging policy. The method further includes: receiving the second charging policy from the second terminal.

It should be noted that when the first terminal may be a vehicle or a charging apparatus in a vehicle, the second terminal may be a charging pile; or when the first terminal may be a charging pile, the second terminal may be a vehicle or a charging apparatus in a vehicle.

S303: Send target charging policy information to the second terminal.

After determining the target charging policy, the first terminal may send, to the second terminal, the target charging policy information corresponding to the target charging policy.

S304: Configure a charging parameter based on the target charging policy.

After the target charging policy is determined, the first terminal and the second terminal may separately subsequently configure the charging parameter based on the determined target charging policy.

Optionally, the target charging policy may include a plurality of state of charge ranges and a plurality of phase charging policies. The plurality of state of charge ranges are in one-to-one correspondence with the plurality of phase charging policies. The first terminal and the second terminal select one phase charging policy from the plurality of phase charging policies as a current phase charging policy based on a current state of charge and the target charging policy; and configure the charging parameter based on the current phase charging policy.

In addition, as a charging process proceeds, the first terminal and the second terminal may further reselect one phase charging policy from the plurality of phase charging policies based on a change of the current state of charge to update the current phase charging policy; and reconfigure the charging parameter based on the updated current phase charging policy.

In this embodiment, after the charging pile and the vehicle complete a charging handshake, a generation sequence of the charging policy stored in the charging pile and a generation sequence of the charging policy stored in the vehicle may be compared, to determine relatively new charging policy information as the target charging policy. In this way, the target charging policy is used to subsequently configure the charging parameter, so that the charging parameter configured in the charging process can be better adapted to a current performance status of the power battery of the vehicle, to improve a lifespan and charging safety of the power battery of the vehicle.

In addition, based on the foregoing method, the following may be further implemented: The vehicle can still be best charged in a latest battery health status at different service providers, and can be charged by using a procedure specified in the national standard GB/T 27930-2015, thereby improving universality of the method and ensuring that a user can charge at different charging service providers by using an optimal charging policy generated based on a latest status.

Figure 6:
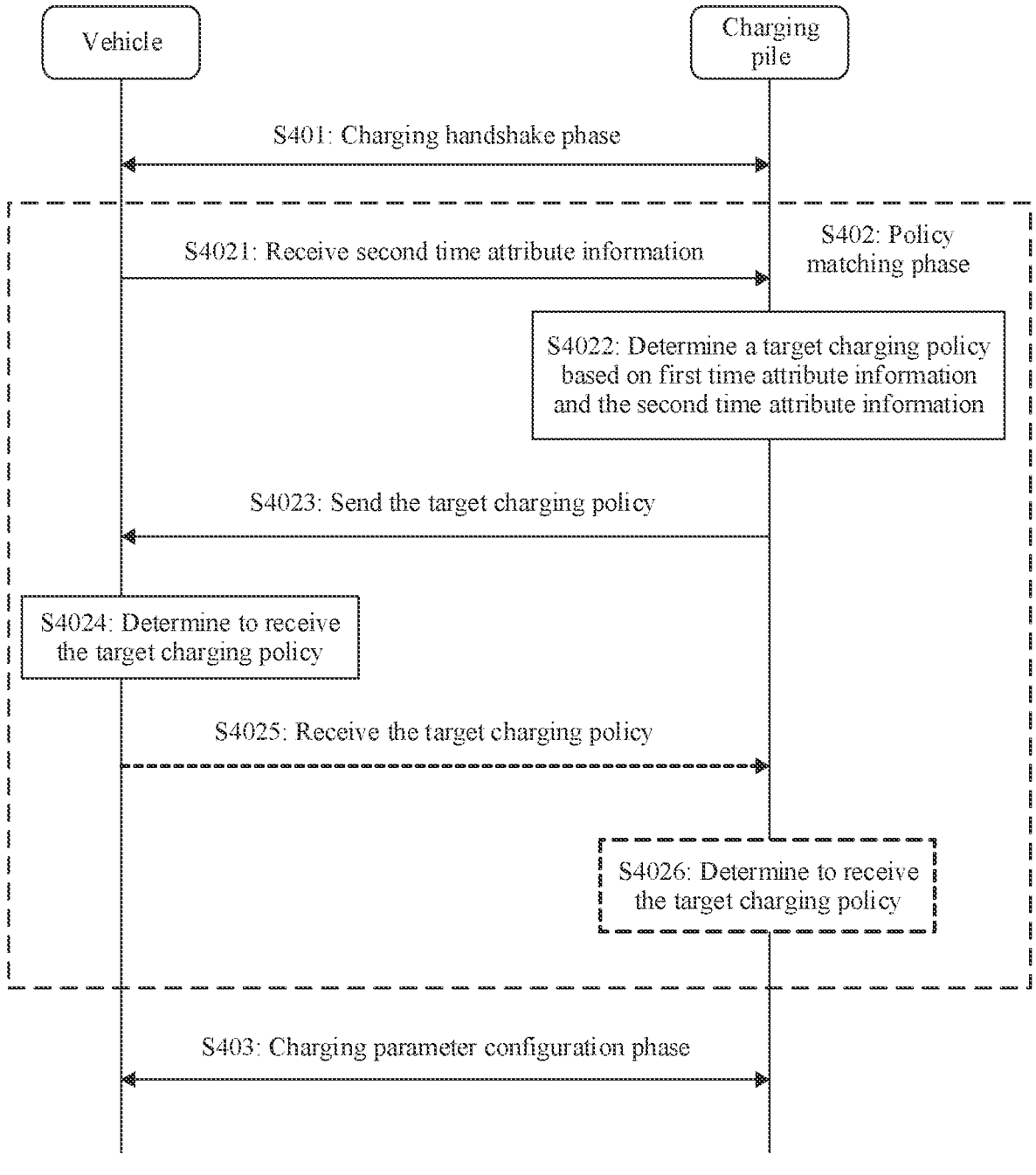
FIG. 6 is a schematic flowchart of a third charging control method according to an embodiment of this application.

FIG. 6 is a schematic flowchart of a third charging control method according to an embodiment of this application. As shown in FIG. 6, the charging control method provided in this embodiment includes the following steps.

S401: Charging handshake phase.

Specifically, the charging handshake phase is divided into a handshake start phase and a handshake identification phase. After a charging pile and a BMS of a vehicle are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of a battery and the charging pile. After the charging handshake phase is completed, the charging pile and the BMS enter a charging parameter configuration phase. In this phase, the charging pile sends a packet of a largest output capability of the charging pile to the BMS. The BMS determines, based on the largest output capability of the charging pile, whether the charging can be performed.

S402: Policy matching phase.

After the charging pile and the BMS complete the charging handshake phase, to determine a target charging policy, policy matching needs to be further performed before the charging phase is performed. Step S402 may include the following steps.

S4021: Receive second time attribute information.

Specifically, the charging pile may receive the second time attribute information from the BMS of the vehicle. A second charging policy is stored in the BMS of the vehicle. The second time attribute information is generated based on a generation time point of the second charging policy. In other words, the second time attribute information is used to indicate the generation time point of the second charging policy.

S4022: Determine a target charging policy based on first time attribute information and the second time attribute information.

Then, after obtaining the second time attribute information in the vehicle, the charging pile determines the target charging policy based on the first time attribute information and the second time attribute information. The target charging policy is a later generated charging policy in the first charging policy and the second charging policy. In other words, the later generated charging policy is determined through comparing a time point indicated by using the first time attribute information and a time point indicated by using the second time attribute information. It can be learned that the target charging policy is a relatively new charging policy in the charging pile and the vehicle, and can be better adapted to a current performance status of a power battery.

S4023: Send the target charging policy.

If a generation time point of the first charging policy in the charging pile is later than or equal to the generation time point of the second charging policy in the vehicle, the target charging policy is the first charging policy. In this case, the charging pile may send the first charging policy to the BMS, so that the BMS of the vehicle can subsequently configure a charging parameter based on the determined target charging policy.

S4024: Determine to receive the target charging policy.

After determining that the target charging policy is received, the BMS may subsequently configure a charging parameter based on the target charging policy.

S4025: Receive the target charging policy.

If a target charging policy identifier is a second charging policy identifier stored in the vehicle, a target charging parameter in target charging policy information is a second charging parameter in the second charging policy. In this case, the charging pile may receive the second charging policy from the BMS, so that the charging pile can subsequently configure the charging parameter based on the determined target charging policy.

S4026: Determine to receive the target charging policy.

After determining that the target charging policy is received, the charging pile may subsequently configure a charging parameter based on the target charging policy.

It should be noted that after step S4023 is performed to determine the target charging policy, if the target charging policy is the first charging policy stored in the charging pile, step S403 is performed after step S4023 and step S4024 are performed; or if the target charging policy is the second charging policy stored in the vehicle, step S403 is performed after step S4025 and step S4026 are performed.

S403: Charging parameter configuration phase.

In this embodiment, after the charging pile and the vehicle complete a charging handshake, a generation sequence of the charging policy stored in the charging pile and a generation sequence of the charging policy stored in the vehicle may be compared in the charging pile, to complete the policy matching phase and determine relatively new charging policy information as the target charging policy. In this way, the target charging policy corresponding to the target charging policy identifier is used to subsequently configure the charging parameter, so that the charging parameter configured in a charging process can be better adapted to a current performance status of the power battery of the vehicle, to improve a lifespan and charging safety of the power battery of the vehicle.

Figure 7:
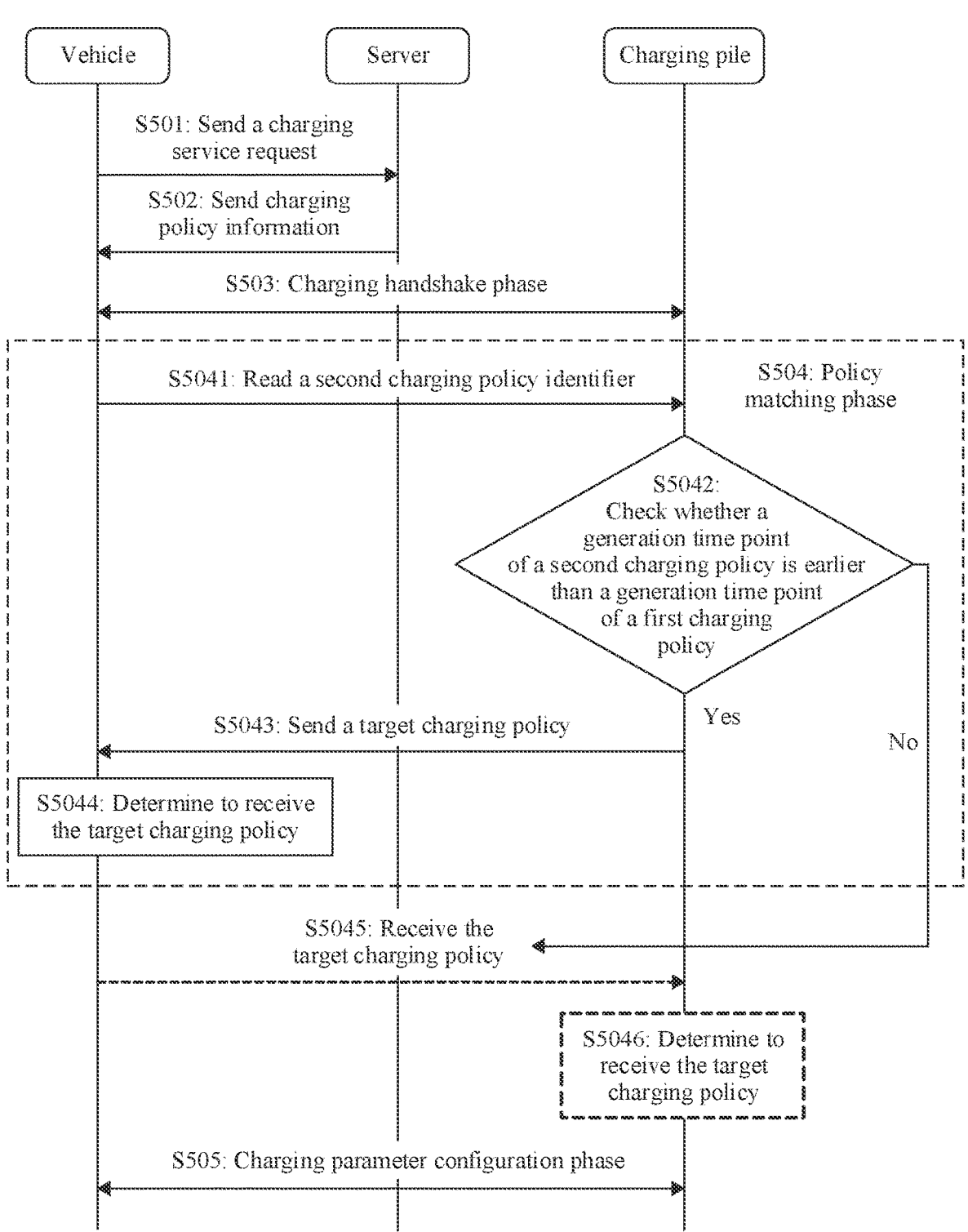
FIG. 7 is a schematic flowchart of a fourth charging control method according to an embodiment of this application.

Based on the embodiment shown in FIG. 6, FIG. 7 is a schematic flowchart of a fourth charging control method according to an embodiment of this application. As shown in FIG. 7, the charging control method provided in this embodiment includes the following steps.

S501: Send a charging service request.

In this embodiment, a charging pile is in a binding relationship with a server. In other words, a vehicle is charged at a charging service provider bound to the vehicle.

In this step, a battery charging application in the server receives the charging service request sent by the vehicle. The charging service request may include an identity of the vehicle. The server may determine charging policy information based on the identity and historical charging and discharging data. The historical charging and discharging data includes charging data and discharging data. The charging data includes a voltage measurement value, a current measurement value, and a temperature measurement value of the battery in each state of charge during charging. The discharging data includes a voltage measurement value, a current measurement value, and a temperature measurement value of the battery in each state of charge during discharging. Specifically, the server may obtain, from a head unit data storage module and/or a charging pile data storage module based on the identity in the charging service request, the historical charging and discharging data corresponding to the identity, and then obtain an optimal charging policy in a current battery status through calculation by using a charging policy calculation module.

S502: Send charging policy information.

After the charging policy calculation module calculates the optimal charging policy, the battery charging application delivers the charging policy information to a BMS of the vehicle and the charging pile. The charging policy information carries a unique time identifier, that is, a charging policy identifier. The identifier is unique and time-related. In other words, a time sequence of two different policies may be determined based on the identifiers. A form of the identifier may be a string or a number. This is not limited in this embodiment.

Optionally, the battery charging application delivers the optimal charging policy to the BMS of the vehicle and the charging pile in a form of a data file or a data packet. After receiving the optimal charging policy, charging interaction modules of the BMS of the vehicle and the charging pile store the optimal charging policy in the data storage module. In this embodiment, if either of the BMS of the vehicle and the charging pile successfully receives the optimal charging policy, subsequent charging configuration may be performed based on the optimal charging policy.

S503: Charging handshake phase.

Specifically, the charging handshake phase is divided into a handshake start phase and a handshake identification phase. After the charging pile and the BMS of the vehicle are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of a battery and the charging pile. After the charging handshake phase is completed, the charging pile and the BMS enter a charging parameter configuration phase. In this phase, the charging pile sends a packet of a largest output capability of the charging pile to the BMS. The BMS determines, based on the largest output capability of the charging pile, whether the charging can be performed.

S504: Policy matching phase.

S5041: Read a second charging policy identifier.

Specifically, the charging pile may read the second charging policy identifier from the BMS of the vehicle. The second charging policy identifier is used to identify a second charging policy generated at a second time point. The second charging policy is stored in the BMS.

S5042: Determine whether the generation time point of the second charging policy identifier is earlier than a generation time point-point of the first charging policy identifier. If the generation time point of the second charging policy identifier is earlier than the generation time point of the first charging policy identifier, perform S5043; or if the generation time point of the second charging policy identifier is not earlier than the generation time point of the first charging policy identifier, perform step S505.

Then, the charging pile may determine whether the generation time point of the second charging policy identifier is earlier than the generation time point of the first charging policy identifier. The first charging policy identifier is used to identify the first charging policy generated at the first time point. The first charging policy is stored in the charging pile. A target charging policy identifier is a policy identifier with a relatively late generation time point. In other words, a target charging policy is a relatively new charging policy in the vehicle and the charging pile, and can be better adapted to a current performance status of a power battery of the vehicle.

S5043: Send the target charging policy.

If the target charging policy identifier is the first charging policy identifier stored in the charging pile, a target charging parameter in the target charging policy is a first charging parameter in the first charging policy. In this case, the charging pile may send the first charging policy to the BMS, so that the BMS of the vehicle can subsequently configure the charging parameter based on the determined target charging policy.

S5044: Determine to receive the target charging policy.

After determining that the target charging policy is received, the BMS may subsequently configure a charging parameter based on the target charging policy.

S5045: Receive the target charging policy.

If the target charging policy identifier is the second charging policy identifier stored in the vehicle, a target charging parameter in the target charging policy is a second charging parameter in the second charging policy. In this case, the charging pile receives the second charging policy from the BMS, so that the charging pile can subsequently configure the charging parameter based on the determined target charging policy.

S5046: Determine to receive the target charging policy.

After determining that the target charging policy is received, the charging pile may subsequently configure a charging parameter based on the target charging policy.

It should be noted that after step S5042 is performed to determine the target charging policy identifier, if the target charging policy identifier is the first charging policy identifier stored in the charging pile, step S505 is performed after step S5043 and step S5044 are performed; or if the target charging policy identifier is the second charging policy identifier stored in the vehicle, step S505 is performed after step S5045 and step S5046 are performed.

S505: Charging parameter configuration phase.

After determining the target charging policy, a charging parameter in the target charging policy may be used for subsequent charging parameter configuration. The charging parameter may include one or more of a charging voltage upper limit, a charging current upper limit, and a charging temperature upper limit.

After completing the policy matching phase and determining the target charging policy, the charging pile and the BMS may obtain a current SOC level and a target charging parameter to determine the current charging parameter.

The target charging policy may include a plurality of state of charge ranges and a plurality of phase charging policies. The plurality of state of charge ranges are in one-to-one correspondence with the plurality of phase charging policies. The first terminal and the second terminal select one phase charging policy from the plurality of phase charging policies as a current phase charging policy based on a current state of charge and the target charging policy; and configure the charging parameter based on the current phase charging policy.

In addition, as a charging process proceeds, the first terminal and the second terminal may further reselect one phase charging policy from the plurality of phase charging policies based on a change of the current state of charge to update the current phase charging policy; and reconfigure the charging parameter based on the updated current phase charging policy.

Specifically, the target charging policy information is shown in Table 3.

TABLE 3

| SOC interval | 0-20 | 20-50 | 50-80 | 80-90 | 90-100 |
|---|---|---|---|---|---|
| Largest charging voltage | V1 | V2 | V3 | V4 | V5 |
| Largest charging current | I1 | I2 | I3 | I4 | I5 |
| Highest charging temperature | T1 | T2 | T3 | T4 | T5 |

For example, if a current SOC level is 8 and is in a 0-20 interval, the current charging parameter may be determined as a largest charging voltage (V1), a largest charging current (I1), and a highest charging temperature (T1). Therefore, the charging pile and the BMS configure the charging parameter based on the largest charging voltage (V1), the largest charging current (I1), and the highest charging temperature (T1). When it is determined that a SOC level reaches 20, that is, the current SOC level reaches a 20-50 interval, the current charging parameter is updated to a largest charging voltage (V2), a largest charging current (I2), and a highest charging temperature (T2) until the charging ends.

Optionally, the charging parameter in each SOC level interval may be sent by using a PGN156 packet in the national standard GB/T 27930-2015. For a specific form of the PGN156 packet, refer to Table 4.

TABLE 4

| Start byte or bit | Length | SPN | SPN definition | Sending option |
|---|---|---|---|---|
| 1 | 2 bytes | 2816 | Largest allowable charging voltage of a single power battery | Mandatory option |
| 3 | 2 bytes | 2817 | Largest allowable charging current | Mandatory option |
| 5 | 2 bytes | 2818 | Nominal total energy of a power battery | Mandatory option |
| 7 | 2 bytes | 2819 | Largest total allowable charging voltage | Mandatory option |
| 9 | 1 byte | 2820 | Highest allowable temperature | Mandatory option |
| 10 | 2 bytes | 2821 | State of charge of a power battery of a whole vehicle | Mandatory option |
| 12 | 2 bytes | 2822 | Current battery voltage of a power battery of a whole vehicle | Mandatory option |

In this embodiment, the BMS and the charging pile perform charging policy identifier matching before the charging starts. If the charging policy identifiers are the same, that is, the charging policy identifiers are both the target charging policy identifier, the charging starts. If the charging policy identifiers are different, the charging is performed based on a policy with a charging policy identifier at a latest time, so that a charging parameter configured in the charging process can be better adapted to a current performance status of the power battery of the vehicle, thereby improving a lifespan and charging safety of the power battery of the vehicle. In addition, the policy matching is performed on the charging pile side, so that the charging can be performed based on the optimal charging policy when a charging policy is lost due to a poor network on the vehicle, and the charging can be performed by using a procedure specified in the national standard GB/T 27930-2015, thereby improving universality of the method and ensuring that the user can charge at different charging service providers by using the optimal charging policy generated based on a latest status.

Based on the foregoing embodiment, after charging control is performed based on the target charging policy corresponding to the target charging policy identifier, the vehicle and/or the charging pile may collect charging data in response to the target charging policy by using a head unit data collecting module or a charging pile data collecting module. The charging data includes a voltage measurement value, a current measurement value, and a temperature measurement value of the battery in each state of charge during charging. Then, the collected charging data is sent to the server for storage to be used as historical charging data for subsequent charging policy calculation.

In addition, the vehicle may further collect discharging data of the battery. The discharging data includes a voltage measurement value, a current measurement value, and a temperature measurement value of the battery in each state of charge during discharging. Then the discharging data is sent to a server for storage to be used as historical discharging data for subsequent charging policy calculation.

Figure 8:
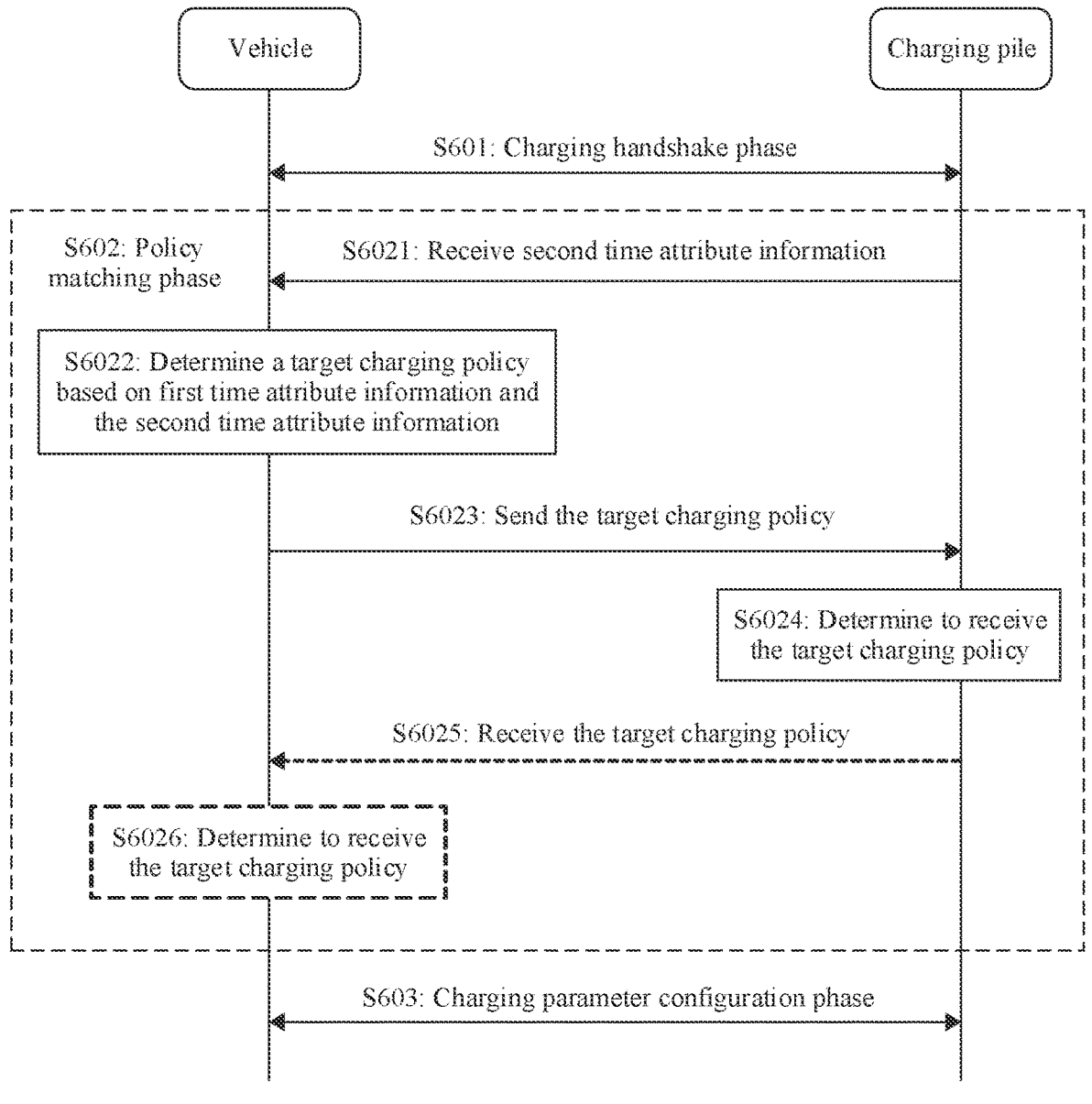
FIG. 8 is a schematic flowchart of a fifth charging control method according to an embodiment of this application.

FIG. 8 is a schematic flowchart of a fifth charging control method according to an embodiment of this application. As shown in FIG. 8, the charging control method provided in this embodiment includes the following steps.

S601: Charging handshake phase.

Specifically, the charging handshake phase is divided into a handshake start phase and a handshake identification phase. After a charging pile and a BMS are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of a battery and the charging pile. After the charging handshake phase is completed, the charging pile and the BMS enter a charging parameter configuration phase. In this phase, the charging pile sends a packet of a largest output capability of the charging pile to the BMS. The BMS determines, based on the largest output capability of the charging pile, whether the charging can be performed.

S602: Policy matching phase.

After the charging pile and the BMS complete the charging handshake phase, to determine the target charging policy, policy matching needs to be further performed before the charging phase is performed. Step S602 may include the following steps.

S6021: Receive second time attribute information.

Specifically, the BMS of the vehicle may receive the second time attribute information from the charging pile. A second charging policy is stored in the charging pile. The second time attribute information is generated based on a generation time point of the second charging policy. In other words, the second time attribute information is used to indicate the generation time point of the second charging policy.

S6022: Determine a target charging policy based on first time attribute information and the second time attribute information.

Then, after obtaining the second time attribute information in the charging pile, the BMS of the vehicle determines the target charging policy based on the first time attribute information and the second time attribute information. The target charging policy is a later generated charging policy in the first charging policy and the second charging policy. In other words, the later generated charging policy is determined through comparing a time point indicated by using the first time attribute information and a time point indicated by using the second time attribute information. It can be learned that the target charging policy is a relatively new charging policy in the charging pile and the vehicle, and can be better adapted to a current performance status of a power battery.

S6023: Send the target charging policy.

If a generation time point of the first charging policy in the BMS of the vehicle is later than or equal to the generation time point of the second charging policy in the charging pile, the target charging policy is the first charging policy. In this case, the BMS of the vehicle may send the first charging policy to the charging pile, so that the charging pile can subsequently configure a charging parameter based on the determined target charging policy.

S6024: Determine to receive the target charging policy.

After determining that the target charging policy is received, the charging pile may subsequently configure a charging parameter based on the target charging policy.

S6025: Receive the target charging policy.

If a target charging policy identifier is a second charging policy identifier stored in the charging pile, a target charging parameter in target charging policy information is a second charging parameter in the second charging policy. In this case, the BMS may receive the second charging policy from the charging pile, so that the BMS can subsequently configure the charging parameter based on the determined target charging policy.

S6026: Determine to receive the target charging policy.

After determining that the target charging policy is received, the BMS may subsequently configure a charging parameter based on the target charging policy.

It should be noted that after step S6023 is performed to determine the target charging policy, if the target charging policy is the first charging policy stored in the charging pile, step S603 is performed after step S6023 and step S6024 are performed; or if the target charging policy is the second charging policy stored in the vehicle, step S603 is performed after step S6025 and S6026 are performed.

S603: Charging parameter configuration phase.

In this embodiment, after the charging pile and the vehicle complete a charging handshake, a generation sequence of the charging policy stored in the charging pile and a generation sequence of the charging policy stored in the vehicle may be compared in the BMS of the vehicle, to complete the policy matching phase and determine a relatively new charging policy as the target charging policy. In this way, the target charging policy corresponding to the target charging policy identifier is used to subsequently configure the charging parameter, so that the charging parameter configured in a charging process can be better adapted to a current performance status of the power battery of the vehicle, to improve a lifespan and charging safety of the power battery of the vehicle.

Figure 9:
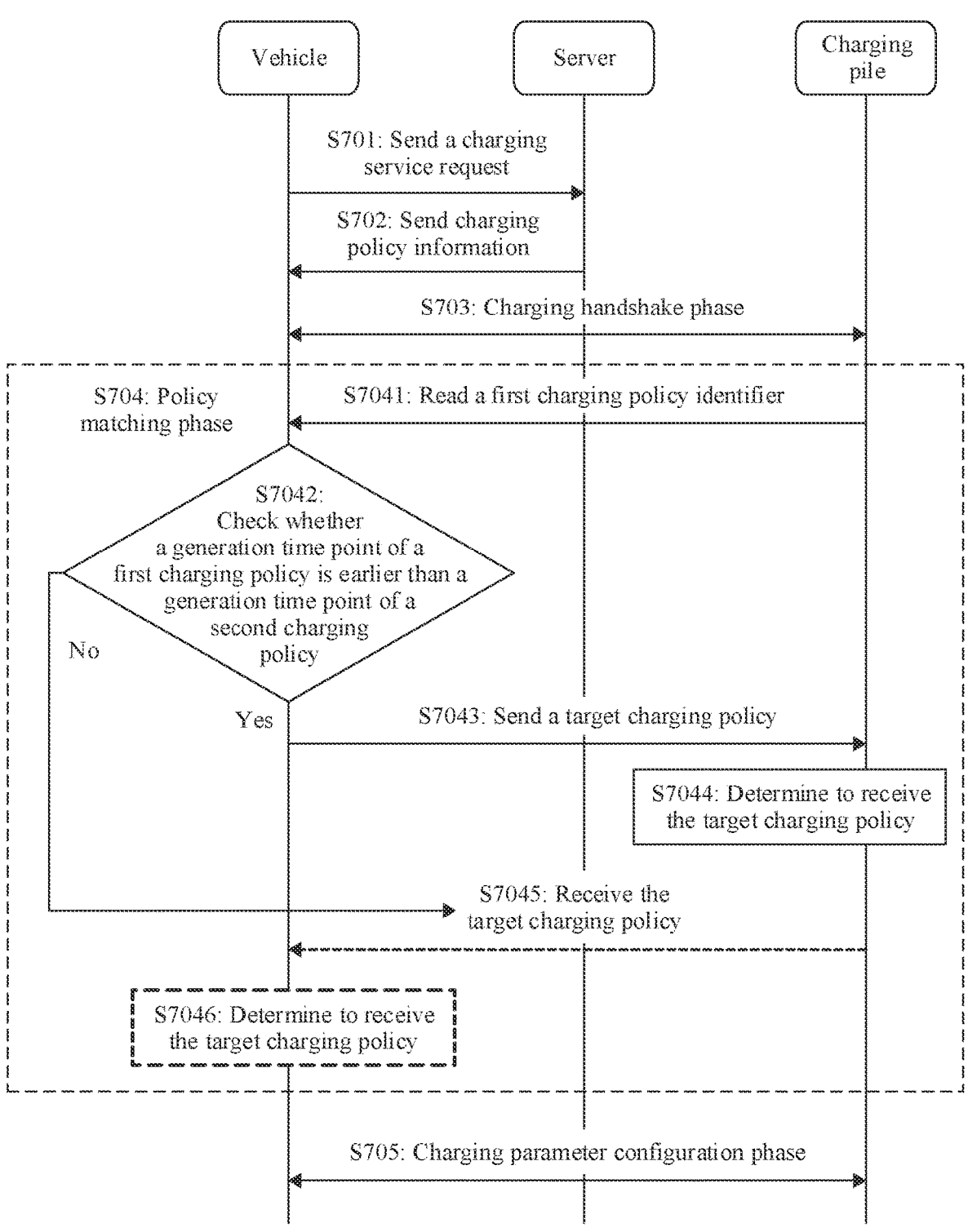
FIG. 9 is a schematic flowchart of a sixth charging control method according to an embodiment of this application.

FIG. 9 is a schematic flowchart of a sixth charging control method according to an embodiment of this application. As shown in FIG. 9, the charging control method provided in this embodiment includes the following steps.

S701: Send a charging service request.

In this embodiment, a charging pile is in a non-binding relationship with a server. In other words, a vehicle is charged at a charging service provider non-bound to the vehicle.

In this step, a battery charging application in the server receives the charging service request sent by the vehicle. The charging service request may include an identity of the vehicle. The server may determine a charging policy based on the identity and historical charging and discharging data. The historical charging and discharging data includes charging data and discharging data. The charging data includes a voltage measurement value, a current measurement value, and a temperature measurement value of the battery in each state of charge during charging. The discharging data includes a voltage measurement value, a current measurement value, and a temperature measurement value of the battery in each state of charge during discharging. Specifically, the server may obtain, from a head unit data storage module and/or a charging pile data storage module based on the identity in the charging service request, the historical charging and discharging data corresponding to the identity, and then obtain an optimal charging policy in a current battery status through calculation by using a charging policy calculation module.

S702: Send a charging policy.

After the charging policy calculation module calculates the optimal charging policy, the battery charging application sends the charging policy to a BMS of the vehicle. The charging policy carries a unique time identifier, that is, a charging policy identifier. The identifier is unique and time-related. In other words, a time sequence of two different policies may be determined based on the identifiers. A form of the identifier may be a string or a number. This is not limited in this embodiment.

Optionally, the battery charging application delivers the optimal charging policy to the BMS of the vehicle in a form of a data file or a data packet. After receiving the optimal charging policy, a charging interaction module of the BMS of the vehicle stores the optimal charging policy in the head unit data storage module.

Optionally, the battery charging application delivers the optimal charging policy to the BMS of the vehicle in a form of a data file or a data packet. After receiving the optimal charging policy, the charging interaction module of the BMS of the vehicle stores the optimal charging policy in the data storage module.

S703: Charging handshake phase.

Specifically, the charging handshake phase is divided into a handshake start phase and a handshake identification phase. After the charging pile and the BMS of the vehicle are physically connected and powered on, a low-voltage auxiliary power supply is enabled, to enter the start phase. In this case, a handshake packet is sent, and then insulation monitoring is performed. After the insulation monitoring ends, here enters the handshake identification phase. The charging pile and the BMS send identification packets to determine information of a battery and the charging pile. After the charging handshake phase is completed, the charging pile and the BMS enter a charging parameter configuration phase. In this phase, the charging pile sends a packet of a largest output capability of the charging pile to the BMS. The BMS determines, based on the largest output capability of the charging pile, whether the charging can be performed.

S704: Policy matching phase.

S7041: Read a second charging policy identifier.

Specifically, the BMS of the vehicle may read the second charging policy identifier from the charging pile. The second charging policy identifier is used to identify a second charging policy generated at a second time point. The second charging policy is stored in the charging pile.

S7042: Determine whether the generation time point of the second charging policy identifier is earlier than a generation time point of the first charging policy identifier. If the generation time point of the second charging policy identifier is earlier than the generation time point of the first charging policy identifier, perform S5043; or if the generation time point of the second charging policy identifier is not earlier than the generation time point of the first charging policy identifier, perform step S505.

Then, the BMS may determine whether the generation time point of the second charging policy identifier is earlier than the generation time point of the first charging policy identifier. The first charging policy identifier is used to identify the first charging policy generated at the first time point. The first charging policy is stored in the BMS. A target charging policy identifier is a policy identifier with a relatively late generation time point. In other words, a target charging policy is a relatively new charging policy in the vehicle and the charging pile, and can be better adapted to a current performance status of a power battery of the vehicle.

S7043: Send the target charging policy.

If the target charging policy identifier is the first charging policy identifier stored in the BMS, a target charging parameter in the target charging policy is a first charging parameter in the first charging policy. In this case, the BMS may send the first charging policy to the charging pile, so that the charging pile can subsequently configure the charging parameter based on the determined target charging policy.

S7044: Determine to receive the target charging policy.

S7045: Receive the target charging policy.

If the target charging policy identifier is the second charging policy identifier stored in the charging pile, a target charging parameter in the target charging policy is a second charging parameter in the second charging policy. In this case, the BMS receives the second charging policy from the charging pile, so that the BMS can subsequently configure the charging parameter based on the determined target charging policy.

S7046: Determine to receive the target charging policy.

After determining that the target charging policy is received, the BMS may subsequently configure a charging parameter based on the target charging policy.

It should be noted that after step S7042 is performed to determine the target charging policy identifier, if the target charging policy identifier is the first charging policy identifier stored in the charging pile, step S705 is performed after step S7043 and step S7044 are performed; or if the target charging policy identifier is the second charging policy identifier stored in the vehicle, step S705 is performed after step S7045 and step S7046 are performed.

S705: Charging parameter configuration phase.

After determining the target charging policy, a charging parameter in the target charging policy may be used for subsequent charging parameter configuration. The charging parameter may include one or more of a charging voltage upper limit, a charging current upper limit, and a charging temperature upper limit.

In this embodiment, the BMS and the charging pile perform charging policy identifier matching before the charging starts. If the charging policy identifiers are the same, that is, the charging policy identifiers are both the target charging policy identifier, the charging starts. If the charging policy identifiers are different, the charging is performed based on a policy with a charging policy identifier at a latest time, so that a charging parameter configured in the charging process can be better adapted to a current performance status of the power battery of the vehicle, thereby improving a lifespan and charging safety of the power battery of the vehicle. In addition, policy matching is performed on a BMS side, so that the vehicle can still be best charged at different service providers, and can be charged by using a procedure specified in the national standard GB/T 27930-2015, thereby improving universality of the method and ensuring that a user can charge at different charging service providers by using an optimal charging policy generated based on a latest status.

Figure 10:
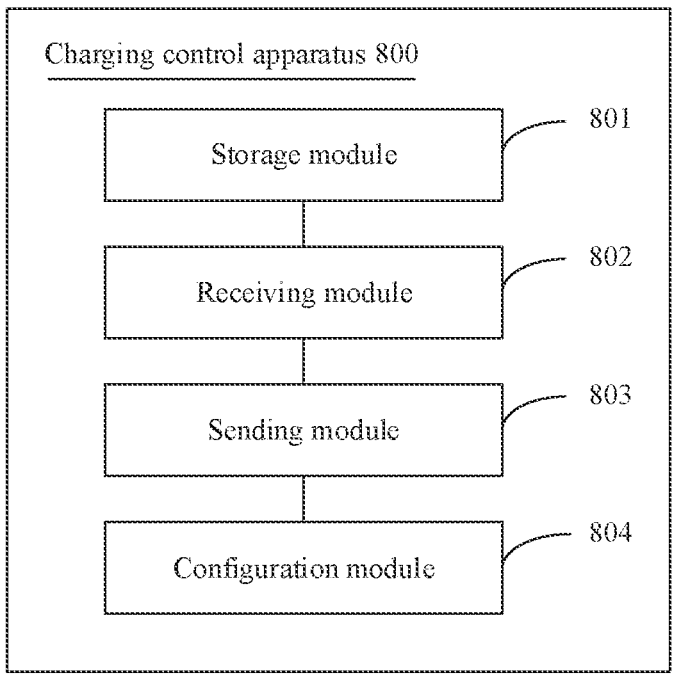
FIG. 10 is a schematic diagram of a structure of a charging control apparatus according to an embodiment of this application.

FIG. 10 is a schematic diagram of a structure of a charging control apparatus according to an embodiment of this application. As shown in FIG. 10, the charging control apparatus 800 provided in this embodiment may be configured to perform an operation performed by a first terminal in the charging control methods shown in FIG. 3 to FIG. 9. The charging control apparatus 800 includes a storage module 801, a receiving module 802, a sending module 803, and a configuration module 804.

The storage module 801 is configured to store a first charging policy and first time attribute information generated based on a generation time point of the first charging policy.

The receiving module 802 is configured to receive second time attribute information from a second terminal. The second time attribute information is generated based on a generation time point of a second charging policy. The second charging policy is stored in the second terminal.

The sending module 803 is configured to send target charging policy information to the second terminal. The target charging policy information is used to indicate a target charging policy determined based on the first time attribute information and the second time attribute information. The target charging policy is a later generated charging policy in the first charging policy and the second charging policy.

The configuration module 804 is configured to configure a charging parameter based on the target charging policy.

If the generation time point of the first charging policy is later than or equal to the generation time point of the second charging policy, the target charging policy is the first charging policy. The target charging policy information includes the first charging policy. If the generation time point of the first charging policy is earlier than or equal to the generation time point of the second charging policy, the target charging policy is the second charging policy. The method further includes: receiving the second charging policy from the second terminal.

In a possible design, the charging control apparatus 800 may further include a handshake module 805, configured to perform a charging handshake with the second terminal.

Optionally, when the target charging policy includes a plurality of state of charge ranges and a plurality of phase charging policies, the plurality of state of charge ranges are in one-to-one correspondence with the plurality of phase charging policies. The configuration module 804 is specifically configured to: select one phase charging policy from the plurality of phase charging policies as a current phase charging policy based on a current state of charge and the target charging policy; and configure the charging parameter based on the current phase charging policy.

In a possible design, the configuration module 804 is further configured to: reselect one phase charging policy from the plurality of phase charging policies based on a change of the current state of charge to update the current phase charging policy; and reconfigure the charging parameter based on the updated current phase charging policy.

In addition, the receiving module 802 is further configured to receive the first charging policy and the first time attribute information from a server.

Figure 11:
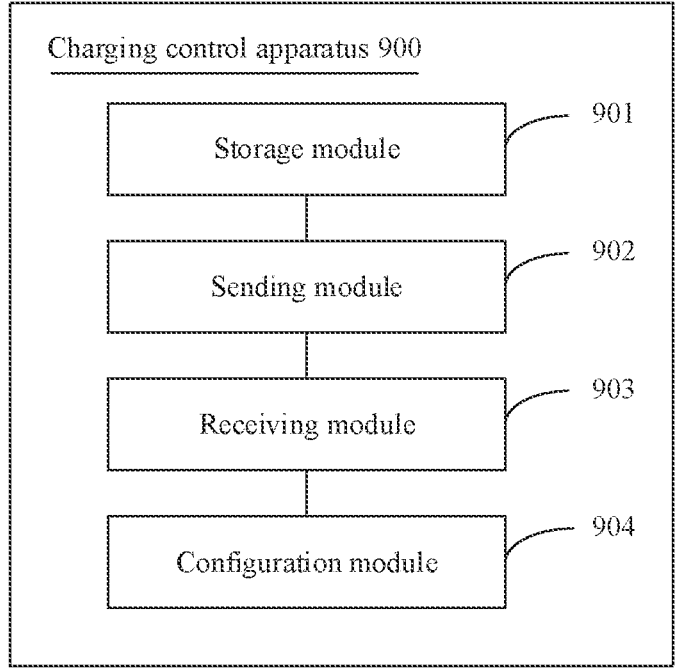
FIG. 11 is a schematic diagram of a structure of another charging control apparatus according to an embodiment of this application.

FIG. 11 is a schematic diagram of a structure of another charging control apparatus according to an embodiment of this application. As shown in FIG. 11, the charging control apparatus 900 provided in this embodiment may be configured to perform an operation performed by a second terminal in the charging control methods shown in FIG. 3 to FIG. 9.

The charging control apparatus 900 includes a storage module 901, a sending module 902, a receiving module 903, and a configuration module 904.

The storage module 901 is configured to store a second charging policy and second time attribute information generated based on a generation time point of the second charging policy.

The sending module 902 is configured to send the second time attribute information to a first terminal.

The receiving module 903 is configured to receive target charging policy information from the first terminal. The target charging policy information is used to indicate a target charging policy that is determined by the first terminal based on first time attribute information and the second time attribute information. The first time attribute information is generated based on a generation time point of a first charging policy stored in the first terminal. The target charging policy is a later generated charging policy in the first charging policy and the second charging policy.

The configuration module 904 is configured to configure a charging parameter based on the target charging policy.

If the generation time point of the first charging policy is later than or equal to the generation time point of the second charging policy, the target charging policy is the first charging policy. The target charging policy information includes the first charging policy. If the generation time point of the first charging policy is earlier than or equal to the generation time point of the second charging policy, the target charging policy is the second charging policy. The method further includes: sending the second charging policy to the first terminal.

In a possible design, the charging control apparatus 900 may further include: a handshake module 905, configured to perform a charging handshake with the first terminal.

Optionally, when the target charging policy includes a plurality of state of charge ranges and a plurality of phase charging policies, the plurality of state of charge ranges are in one-to-one correspondence with the plurality of phase charging policies. The configuration module 904 is specifically configured to: select one phase charging policy from the plurality of phase charging policies as a current phase charging policy based on a current state of charge and the target charging policy; and configure the charging parameter based on the current phase charging policy.

In a possible design, the configuration module 904 is further configured to: reselect one phase charging policy from the plurality of phase charging policies based on a change of the current state of charge to update the current phase charging policy; and reconfigure the charging parameter based on the updated current phase charging policy.

In a possible design, the receiving module 903 is further configured to receive the first charging policy and the first time attribute information from a server.

If the charging control apparatus shown in FIG. 10 is a charging pile, the charging control apparatus shown in FIG. 11 is a vehicle or a charging apparatus in a vehicle. Alternatively, if the charging control apparatus shown in FIG. 11 is a vehicle or a charging apparatus of a vehicle, the charging control apparatus shown in FIG. 10 is a charging pile.

In addition, an embodiment of this application further provides a charging control system, including: the charging control apparatus shown in FIG. 10 and the charging control apparatus shown in FIG. 11.

Figure 12:
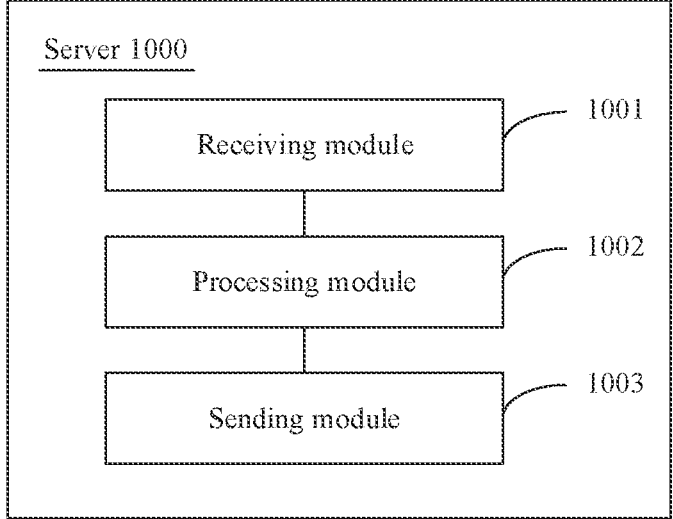
FIG. 12 is a schematic diagram of a structure of a server according to an embodiment of this application.

FIG. 12 is a schematic diagram of a structure of a server according to an embodiment of this application. As shown in FIG. 12, the server 1000 provided in this embodiment includes a receiving module 1001, a processing module 1002, and a sending module 1003.

The receiving module 1001 is configured to receive a charging service request sent by a vehicle. The charging service request includes an identity of the vehicle.

The processing module 1002 is configured to generate a charging policy based on the identity and historical charging and discharging data of a battery in the vehicle.

The processing module 1002 is further configured to generate time attribute information based on a time point at which the charging policy is generated.

The sending module 1003 is configured to send the charging policy and the time attribute information to the vehicle.

In a possible design, the receiving module 1001 is further configured to receive the historical charging and discharging data sent by the vehicle. In addition, the receiving module 1001 is further configured to receive historical charging data sent by a charging pile.

In a possible design, the foregoing charging control system may further include the server shown in FIG. 12.

Figure 13:
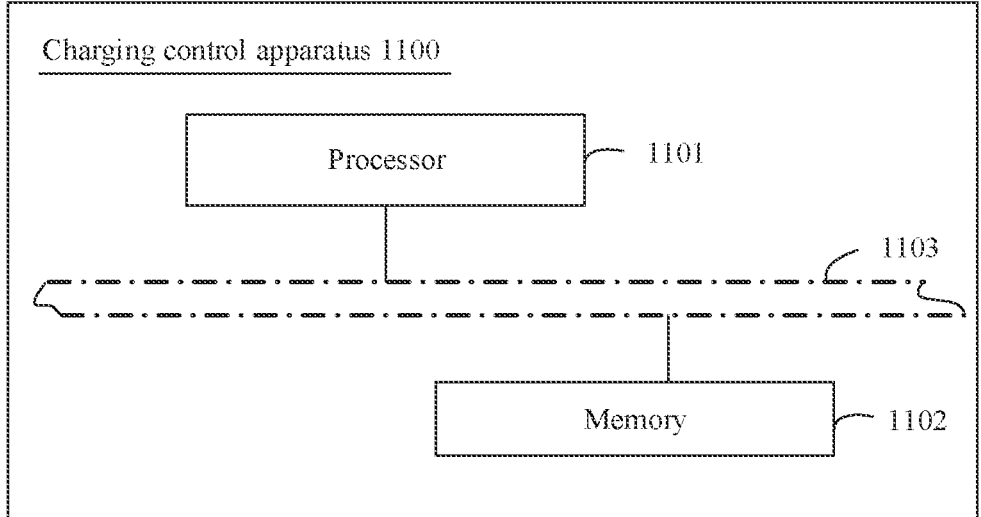
FIG. 13 is a schematic diagram of a structure of a charging control apparatus according to an embodiment of this application.

FIG. 13 is a schematic diagram of a structure of a charging control apparatus according to an embodiment of this application. As shown in FIG. 13, the charging control apparatus 1100 provided in this embodiment includes:

a processor 1101; and a memory 1102, configured to store executable instructions of the processor, where the memory may further be a flash (a flash memory).

The processor 1101 is configured to execute, by using the executable instructions, operations performed by the first terminal in the charging control methods shown in FIG. 3 to FIG. 9. For details, refer to the related descriptions in the foregoing method embodiments.

Optionally, the memory 1102 may be independent, or may be integrated with the processor 1101.

When the memory 1102 is a device independent of the processor 1101, the charging control apparatus 1100 may further include:

a bus 1103, configured to connect the processor 1101 and the memory 1102.

Figure 14:
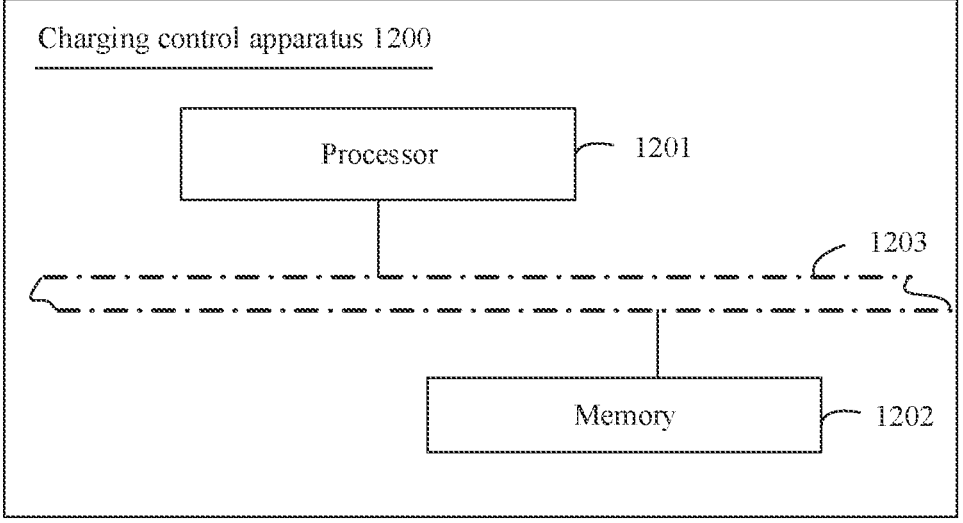
FIG. 14 is a schematic diagram of a structure of another charging control apparatus according to an embodiment of this application.

FIG. 14 is a schematic diagram of a structure of another charging control apparatus according to an embodiment of this application. As shown in FIG. 14, the charging control apparatus 1200 provided in this embodiment includes:

a processor 1201; and a memory 1202, configured to store executable instructions of the processor, where the memory may further be a flash (a flash memory).

The processor 1201 is configured to execute, by using the executable instructions, operations performed by the second terminal in the charging control methods shown in FIG. 3 to FIG. 9. For details, refer to the related descriptions in the foregoing method embodiments.

Optionally, the memory 1202 may be independent, or may be integrated with the processor 1201.

When the memory 1202 is a device independent of the processor 1201, the charging control apparatus 1200 may further include:

a bus 1203, configured to connect the processor 1201 and the memory 1202.

In addition, an embodiment of this application further provides a charging control system, including: the charging control apparatus shown in FIG. 13 and the charging control apparatus shown in FIG. 14.

Figure 15:
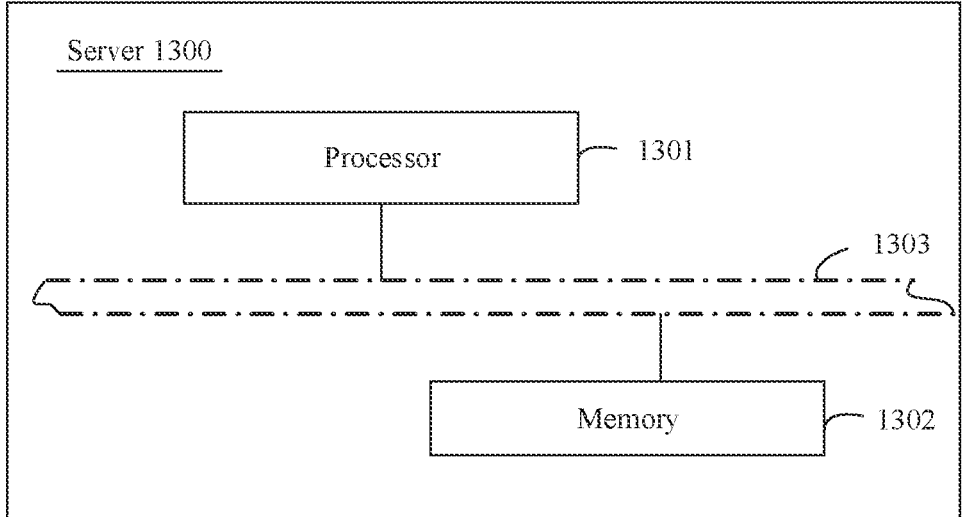
FIG. 15 is a schematic diagram of a structure of a server according to an embodiment of this application.

FIG. 15 is a schematic diagram of a structure of a server according to an embodiment of this application. As shown in FIG. 14, the charging control apparatus 1300 provided in this embodiment includes:

a processor 1301; and a memory 1302, configured to store executable instructions of the processor, where the memory may further be a flash (a flash memory).

The processor 1301 is configured to execute steps on a server side in any one of the foregoing methods through executing the executable instructions. For details, refer to the related descriptions in the foregoing method embodiments.

Optionally, the memory 1302 may be independent, or may be integrated with the processor 1301.

When the memory 1302 is a device independent of the processor 1301, the charging control apparatus 1300 may further include:

a bus 1303, configured to connect the processor 1301 and the memory 1302.

In a possible design, the foregoing charging control system may further include the server shown in FIG. 15.

An embodiment further provides a readable storage medium. The readable storage medium stores a computer program. When at least one processor of an electric device executes the computer program, the electric device performs the steps of the first terminal in the method provided in the foregoing various implementations.

An embodiment further provides a readable storage medium. The readable storage medium stores a computer program. When at least one processor of an electric device executes the computer program, the electric device performs the steps of the second terminal in the method provided in the foregoing various implementations.

An embodiment further provides a readable storage medium. The readable storage medium stores a computer program. When at least one processor of an electric device executes the computer program, the electric device performs the steps on the server side in the method provided in the foregoing various implementations.

An embodiment further provides a computer program product including instructions. When the computer program product runs on an electric device, the computer is enabled to perform steps performed by the first terminal in the method provided in the foregoing various implementations.

An embodiment further provides a computer program product including instructions. When the computer program product runs on an electric device, the computer is enabled to perform steps performed by the second terminal in the method provided in the foregoing various implementations.

An embodiment further provides a computer program product including instructions. When the computer program product runs on an electric device, the computer is enabled to perform steps performed by the server in the method provided in the foregoing various implementations.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A charging control apparatus applied to a first terminal, wherein the first terminal stores a first charging policy and first time attribute information generated based on a generation time point of the first charging policy, the charging control apparatus comprises at least one processor and at least one memory coupled to the at least one processor, the at least one memory stores programming instructions for execution by the at least one processor to cause the charging control apparatus to:

receive second time attribute information from a second terminal, wherein the second time attribute information is generated based on a generation time point of a second charging policy, and the second charging policy is stored in the second terminal;

send target charging policy information to the second terminal, wherein the target charging policy information indicates a target charging policy that is determined by the first terminal based on the first time attribute information and the second time attribute information, the target charging policy comprises a plurality of ranges of a state of charge, the state of charge is a ratio of a remaining capacity to a capacity in a fully charged state, and the target charging policy is a later generated charging policy in the first charging policy and the second charging policy;

configure a charging parameter based on the target charging policy, wherein the charging parameter comprises at least one of a charging voltage, a charging current, or a charging temperature, and each range of the state of charge comprises a plurality of state of charge levels, the target charging policy comprises a plurality of phase charging policies that are in one-to-one correspondence with the plurality of ranges of the state of charge, and each phase charging policy of the plurality of phase charging policies sets one or more charging parameters for the corresponding range of the state of charge, and configuring the charging parameter based on the target charging policy comprises:

determining a current level of the state of charge;
determining a current range of the state of charge that the current level of the state of charge belongs to;
determining a first phase charging policy from the plurality of phase charging policies as a current phase charging policy based on the current range of the state of charge; and
configure the charging parameter based on the one or more charging parameters set the current phase charging policy; and perform a charging handshake with the second terminal.

2. The charging control apparatus according to claim 1, wherein the generation time point of the first charging policy is later than or equal to the generation time point of the second charging policy, the target charging policy is the first charging policy, and the target charging policy information comprises the first charging policy.

3. The charging control apparatus according to claim 1, wherein the generation time point of the first charging policy is earlier than or equal to the generation time point of the second charging policy, the target charging policy is the second charging policy, and the programming instructions are for execution by the at least one processor to cause the charging control apparatus to:

receive the second charging policy from the second terminal.

4. The charging control apparatus according to claim 1, wherein the programming instructions are for execution by the at least one processor to cause the charging control apparatus to:

re-select a second phase charging policy from the plurality of phase charging policies based on a change of the current state of charge to update the current phase charging policy; and
reconfigure the charging parameter based on the updated current phase charging policy.

5. The charging control apparatus according to claim 1, wherein the programming instructions are for execution by the at least one processor to cause the charging control apparatus to:

receive the first charging policy and the first time attribute information from a server.

6. The charging control apparatus according to claim 1, wherein the second terminal is a charging pile.

7. A charging control apparatus applied to a second terminal, wherein the second terminal stores a second charging policy and second time attribute information generated based on a generation time point of the second charging policy, the charging control apparatus comprises at least one processor and at least one memory coupled to the at least one processor, the at least one memory stores programming instructions for execution by the at least one processor to cause the charging control apparatus to:

send the second time attribute information to a first terminal;
receive target charging policy information from the first terminal, wherein the target charging policy information indicates a target charging policy that is determined by the first terminal based on first time attribute information and the second time attribute information, the first time attribute information is generated based on a generation time point of a first charging policy stored in the first terminal, the target charging policy comprises a plurality of ranges of a state of charge, the state of charge is a ratio of a remaining capacity to a capacity in a fully charged state, and the target charging policy is a later generated charging policy in the first charging policy and the second charging policy;

configure a charging parameter based on the target charging policy, wherein the charging parameter comprises at least one of a charging voltage, a charging current, or a charging temperature, and each range of the state of charge comprises a plurality of state of charge levels, the target charging policy comprises a plurality of phase charging policies that are in one-to-one correspondence with the plurality of ranges of the state of charge, and each phase charging policy of the plurality of phase charging policies sets one or more charging parameters for the corresponding range of the state of charge, and configuring the charging parameter based on the target charging policy comprises:

determining a current level of the state of charge;
determining a current range of the state of charge that the current level of the state of charge belongs to;
determining a first phase charging policy from the plurality of phase charging policies as a current phase charging policy based on the current range of the state of charge; and
configure the charging parameter based on the one or more charging parameters set the current phase charging policy; and perform a charging handshake with the first terminal.

8. The charging control apparatus according to claim 7, wherein the generation time point of the first charging policy is later than or equal to the generation time point of the second charging policy, the target charging policy is the first charging policy, and the target charging policy information comprises the first charging policy.

9. The charging control apparatus according to claim 7, wherein the generation time point of the first charging policy is earlier than or equal to the generation time point of the second charging policy, the target charging policy is the second charging policy, and the programming instructions are for execution by the at least one processor to cause the charging control apparatus to:

send the second charging policy to the first terminal.

10. The charging control apparatus according to claim 7, wherein the programming instructions are for execution by the at least one processor to cause the charging control apparatus to:

re-select a second phase charging policy from the plurality of phase charging policies based on a change of the current state of charge to update the current phase charging policy; and
reconfigure the charging parameter based on the updated current phase charging policy.

11. The charging control apparatus according to claim 7, wherein the programming instructions are for execution by the at least one processor to cause the charging control apparatus to:

receive the second charging policy and the second time attribute information from a server.

12. The charging control apparatus according to claim 7, wherein the second terminal is a charging pile.

13. A charging control apparatus, comprising at least one processor and at least one memory coupled to the at least one processor, wherein the at least one memory stores programming instructions for execution by the at least one processor to cause the charging control apparatus to:

receive a charging service request sent by a vehicle, wherein the charging service request comprises an identity of the vehicle;

generate a charging policy based on the identity and historical charging and discharging data of a battery in the vehicle, wherein the vehicle is configured to perform a charging handshake with a charging pile, and the charging policy comprises a plurality of ranges of a state of charge, the state of charge is a ratio of a remaining capacity to a capacity in a fully charged state;

generate time attribute information based on a time point at which the charging policy is generated; and send the charging policy and the time attribute information to the vehicle, wherein each range of the state of charge comprises a plurality of state of charge levels, the charging policy comprises a plurality of phase charging policies that are in one-to-one correspondence with the plurality of ranges of the state of charge, and each phase charging policy of the plurality of phase charging policies sets one or more charging parameters for the corresponding range of the state of charge, and each charging parameter comprises at least one of a charging voltage, a charging current, or a charging temperature.

14. The charging control apparatus according to claim 13, wherein the charging control apparatus is applied to a server.

15. The charging control apparatus according to claim 13, wherein the historical charging and discharging data includes at least one of a voltage measurement value, a current measurement value, and a temperature measurement value of the battery.

16. The charging control apparatus according to claim 13, wherein the historical charging and discharging data is obtained from a head unit data storage module based on the identity of the vehicle in the charging service request.

17. The charging control apparatus according to claim 13, wherein the programming instructions are for execution by the at least one processor to cause the charging control apparatus to:

send the charging policy to the charging pile.

18. The charging control apparatus according to claim 17, wherein the charging policy includes a charging policy identifier, and the charging policy identifier is a time identifier determining a time sequence of two different policies.

* * * * *